US008830844B2

(12) United States Patent
Mathias et al.

(10) Patent No.: US 8,830,844 B2
(45) Date of Patent: Sep. 9, 2014

(54) DELAYING NETWORK RESELECTION FOLLOWING PERFORMANCE OF A CIRCUIT SWITCHED FALLBACK PROCEDURE IN A CALL FAILURE SCENARIO

(71) Applicant: Apple Inc, Cupertino, CA (US)

(72) Inventors: Arun G. Mathias, Sunnyvale, CA (US); Jianxiong Shi, Pleasanton, CA (US); Jinghua Ling, Palo Alto, CA (US); Longda Xing, San Jose, CA (US); Wen Zhao, San Jose, CA (US); Gencer Cili, Santa Clara, CA (US); Puneet Mishra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/871,994

(22) Filed: Apr. 26, 2013

(65) Prior Publication Data
US 2013/0329567 A1 Dec. 12, 2013

Related U.S. Application Data

(60) Provisional application No. 61/657,782, filed on Jun. 9, 2012, provisional application No. 61/663,490, filed on Jun. 22, 2012.

(51) Int. Cl.
*H04L 12/26* (2006.01)
*H04W 4/00* (2009.01)
*H04L 12/66* (2006.01)
*H04W 72/00* (2009.01)
*H04W 36/30* (2009.01)
*H04W 36/00* (2009.01)

(52) U.S. Cl.
CPC ......... *H04W 36/30* (2013.01); *H04W 36/0022* (2013.01)
USPC ........... 370/242; 370/331; 370/338; 370/352; 455/452.2

(58) Field of Classification Search
CPC ..... H04W 36/30; H04W 36/34; H04W 36/36; H04W 36/38; H04W 28/02; H04W 28/0236; H04W 28/0242; H04W 28/0247; H04W 28/0273; H04W 28/0284; H04W 28/0289; H04W 4/001; H04W 4/02; H04W 4/021; H04W 4/023; H04W 48/17; H04W 48/20; H04W 76/00; H04W 76/002; H04W 76/02; H04W 76/027
USPC ................. 370/229–237, 241–245, 310–350, 370/351–356; 455/432.1–466
See application file for complete search history.

(56) References Cited

U.S. PATENT DOCUMENTS 8,306,537 B2 * 11/2012 Burbidge et al. ............. 455/436
2009/0232097 A1 * 9/2009 Taneja ........................... 370/331

(Continued)

FOREIGN PATENT DOCUMENTS

EP 2398264 A2 * 12/2011 ............. H04W 8/08
WO WO2010105222 9/2010

(Continued)

OTHER PUBLICATIONS

"Voice Call Handover Mechanisms in Next-Generation 3GPP Systems", Apostolis K. Salkintzis et al., IEEE Communications Magazine, Feb. 2009.

(Continued)

*Primary Examiner* — Tri H Phan
(74) *Attorney, Agent, or Firm* — Womble Carlyle Sandridge & Rice LLP

(57) ABSTRACT

A method for delaying network reselection by a wireless communication device following a call failure is provided. The method can include determining an initiation of a voice call while connected to a first network. The method can further include participating in a circuit switched fallback (CSFB) procedure to transition from the first network to a second network in response to initiation of the voice call. The method can additionally include determining an occurrence of a call failure of the voice call. The method can also include, responsive to the call failure, barring reselection to the first network for a threshold barring period.

23 Claims, 15 Drawing Sheets

(56) References Cited

U.S. PATENT DOCUMENTS

| | | | |
|---|---|---|---|
| 2010/0172301 A1* | 7/2010 | Watfa et al. ................. | 370/328 |
| 2010/0317375 A1* | 12/2010 | Burbidge et al. ............ | 455/458 |
| 2011/0064052 A1* | 3/2011 | Lee ............................... | 370/331 |
| 2011/0077011 A1 | 3/2011 | Wang et al. | |
| 2011/0103277 A1 | 5/2011 | Watfa et al. | |
| 2011/0222509 A1 | 9/2011 | Lee | |
| 2011/0268109 A1* | 11/2011 | Miyata ......................... | 370/352 |
| 2012/0039167 A1* | 2/2012 | Swaminathan et al. ...... | 370/225 |
| 2012/0064884 A1* | 3/2012 | Ramachandran et al. . | 455/422.1 |
| 2012/0120789 A1 | 5/2012 | Ramachandran et al. | |
| 2012/0236709 A1* | 9/2012 | Ramachandran et al. .... | 370/221 |
| 2013/0044613 A1* | 2/2013 | Edara et al. .................. | 370/252 |
| 2013/0051362 A1* | 2/2013 | Lee et al. ...................... | 370/331 |
| 2013/0301466 A1* | 11/2013 | Nenner ......................... | 370/252 |
| 2013/0328996 A1* | 12/2013 | Rawat et al. ................ | 348/14.02 |
| 2014/0087723 A1* | 3/2014 | Cili et al. .................... | 455/426.1 |

FOREIGN PATENT DOCUMENTS

| | | | | |
|---|---|---|---|---|
| WO | 2011073910 A1 | 6/2011 | | |
| WO | WO 2013/162331 A1 * | 10/2013 | ............ | H04W 36/30 |

OTHER PUBLICATIONS

International Search Report and Written Opinion, PCT Application No. PCT/US2013/041960 (corrected), Jul. 29, 2013.
Huawei, "CS Capability of Network for CS Fallback," May 5-9, 2008.

* cited by examiner

DELAYING NETWORK RESELECTION FOLLOWING PERFORMANCE OF A CIRCUIT SWITCHED FALLBACK PROCEDURE IN A CALL FAILURE SCENARIO

CROSS-REFERENCE TO RELATED APPLICATIONS

This application claims priority to both U.S. Provisional Patent Application No. 61/657,782, filed on Jun. 9, 2012, and U.S. Provisional Patent Application No. 61/663,490, filed on Jun. 22, 2012, the contents of both of which are incorporated herein in their entirety by reference.

FIELD OF THE DESCRIBED EMBODIMENTS

The described embodiments relate generally to wireless communications and more particularly to delaying network reselection following performance of a circuit switched fallback (CSFB) procedure in a call failure scenario.

BACKGROUND

Cellular networks using newer radio access technology (RAT) systems, such as Long Term Evolution (LTE) systems, are being developed and deployed. Networks using these newer RATs often support faster data rates than networks utilizing legacy RATs, such as second generation (2G) and third generation (3G) RATs, including Universal Mobile Telecommunications System (UMTS) networks and Global System for Mobile Communications (GSM) networks. However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

Due to the faster data rates offered by LTE networks, devices are often configured to reselect to an LTE network, if available, subsequent to termination of a voice call for which a CSFB procedure has been performed. However, in some instances, termination of a voice call results from a call failure scenario, such as a dropped call, call setup failure, or the like. In such instances, a user can place a follow-up call subsequent to the call failure. As the follow-up call would also have to be handled by the legacy network, if the device immediately reselects the LTE network following the call failure, another CSFB procedure will have to be performed to handle the follow-up call, thus delaying the call setup. Further, repeated performance of a CSFB procedure result in a ping pong effect in which a device can bounce back and forth between an LTE network and a legacy network, particularly in situations in which multiple call failures occur. Moreover, during the network reselection process, the device may not be able to initiate an outgoing call or receive a page for an incoming call. As such, premature reselection of the LTE network can result in further call failures and missed calls.

SUMMARY OF THE DESCRIBED EMBODIMENTS

Some embodiments disclosed herein provide for delaying network reselection following performance of a CSFB procedure in a call failure scenario. In this regard, a wireless communication device in accordance with some example embodiments can delay reselection back to a first network from a legacy network following an occurrence of a call failure of a voice call. The delay can be for a configurable threshold barring period. In some example embodiments, the threshold barring period can be determined based at least in part on historical data indicative of a time taken to establish a successive voice call following a call failure in one or more previous call failure scenarios. Accordingly, some example embodiments can reduce call setup time following a call failure by delaying reselection so that reselection does not occur prematurely, necessitating performance of another CSFB procedure. Further, some example embodiments can avoid call setup failure of a follow-up call initiated during a premature reselection process, as delaying reselection can afford a party to the failed call time to establish a successive voice call as a follow-up to the failed voice call.

In a first embodiment, a method for delaying network reselection by a wireless communication device following a call failure is provided. The method of the first embodiment can include determining an initiation of a voice call while connected to a first network; participating in a CSFB procedure to transition from the first network to a second network in response to initiation of the voice call; determining an occurrence of a call failure of the voice call; and, responsive to the call failure, barring reselection to the first network for a threshold barring period.

In a second embodiment, a wireless communication device is provided. The wireless communication device of the second embodiment can include at least one transceiver and processing circuitry coupled to the at least one transceiver. The at least one transceiver can be configured to transmit data to and receive data from a first network and a second network. The processing circuitry can be configured to control the wireless communication device to at least determine an initiation of a voice call while connected to the first network; participate in a CSFB procedure to transition from the first network to the second network in response to initiation of the voice call; determine an occurrence of a call failure of the voice call; and, responsive to the call failure, bar reselection to the first network for a threshold barring period.

In a third embodiment, a computer program product is provided. The computer program product of the third embodiment can include at least one non-transitory computer readable storage medium having program code stored thereon. The program code can include program code for determining an initiation of a voice call while connected to a first network; program code for participating in a circuit switched fallback (CSFB) procedure to transition from the first network to a second network in response to initiation of the voice call; program code for determining an occurrence of a call failure of the voice call; and program code for, responsive to the call failure, barring reselection to the first network for a threshold barring period.

In a fourth embodiment, an apparatus is provided that can include means for determining an initiation of a voice call while connected to a first network; means for participating in a CSFB procedure to transition from the first network to a second network in response to initiation of the voice call; means for determining an occurrence of a call failure of the voice call; and means for, responsive to the call failure, barring reselection to the first network for a threshold barring period.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
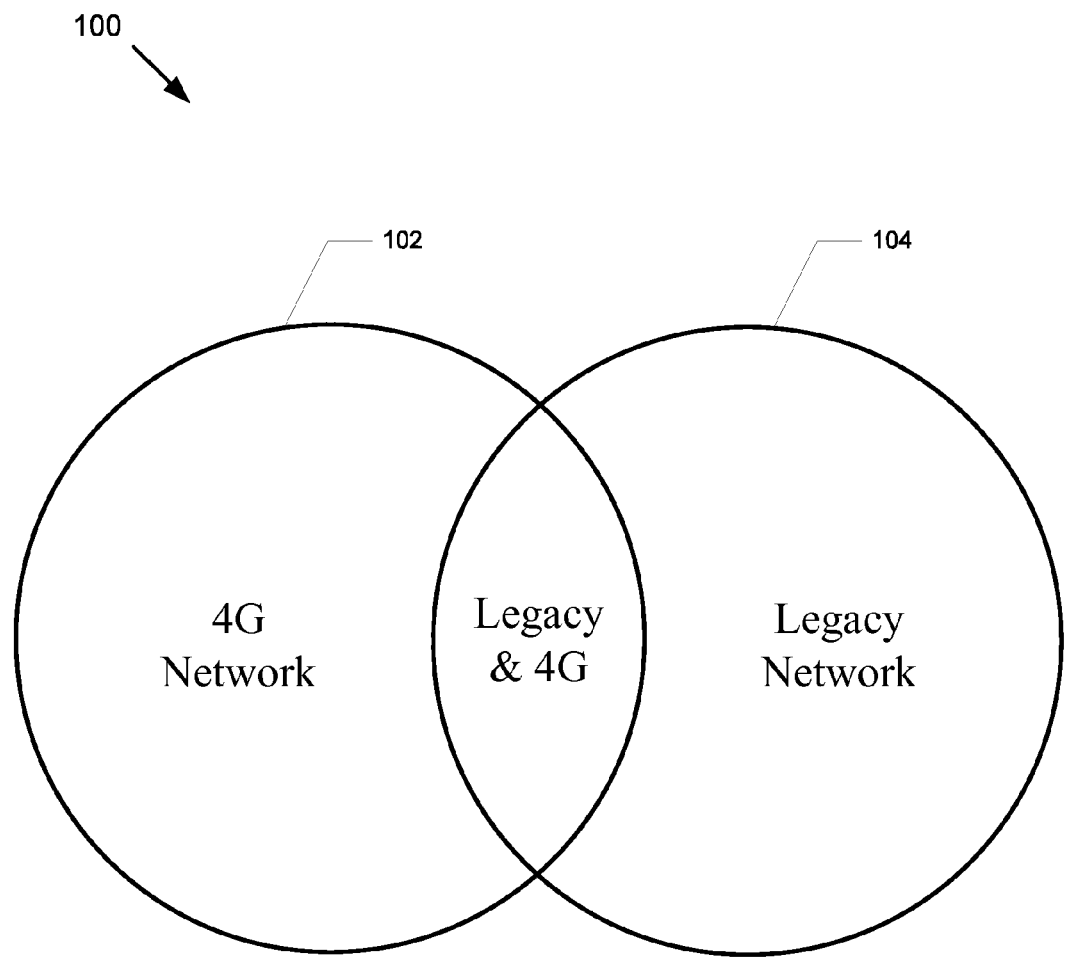
FIG. 1 illustrates overlapping coverage of a fourth generation network and a legacy network in accordance with some example embodiments.

Representative applications of the methods and apparatus disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein delay network reselection following performance of a CSFB procedure in a call failure scenario. More particularly, in accordance with some example embodiments, when a wireless communication device experiences a call failure, such as a dropped call, call setup failure, or the like, after performing a CSFB from a first network to a legacy network to accommodate the voice call, the device can be barred from reselecting the first network for a threshold barring period following the call failure. In this regard, wireless communication devices are typically configured to prefer LTE and other networks offering faster data rates to legacy networks that provide slower data rates, and thus reselection to the first network can be a default preference for the wireless communication device upon termination of a voice call. Accordingly, some example embodiments provide for barring reselection for some period following a call failure scenario.

Barring reselection for the barring period can avoid a ping pong effect, or race condition, of bouncing between the first network and legacy network that might otherwise occur if the wireless communication device prematurely reselects to the first network following the call failure and a successive call is placed soon after reselection to the first network. Further, use of the threshold barring period can reduce the amount of time taken to setup a successive voice call. In this regard, by delaying reselection, unnecessary signaling attendant to a premature reselection and performance of a second CSFB procedure can be avoided. Further call setup failure of a successive call initiated during a premature reselection process can be avoided. In this regard, some example embodiments can avoid situations in which a call is initiated during a premature reselection in which a wireless communication device may not have an established connection with a network that enables an outgoing call to be initiated or to receive a page for an incoming call.

FIG. 1 illustrates overlapping coverage of a fourth generation (4G) network 102 and a legacy network 104 in a communications system 100 in accordance with some example embodiments. The 4G network 102 can, for example, be a network based on an LTE standard, such as an LTE network or an LTE-Advanced (LTE-A) network, or other network that can offer faster data rates than legacy networks, such as 2G and 3G networks, but may not support voice calls. It will be appreciated that the 4G network is illustrated by way of example, and not by way of limitation. In this regard, other networks in existence now or that may be developed in the future that offer higher data rates but that do not support CS voice calls can be substituted for the 4G network 102 within the scope of the disclosure. The legacy network 104 can be any legacy network having a CS domain to support CS voice calls. By way of non-limiting example, the legacy network 104 can be a 3G network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy network 104 can be a CDMA2000 network, such as a 1xRTT network, or other network standardized by the Third Generation Partnership Project 2 (3GPP2) that supports a CS domain. As another example, the legacy network can be a 2G network such as a Global System for Mobile Communications (GSM) network.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network 102 and can perform a CSFB procedure to the legacy network 104 in response to initiation of a voice call.

Figure 2:
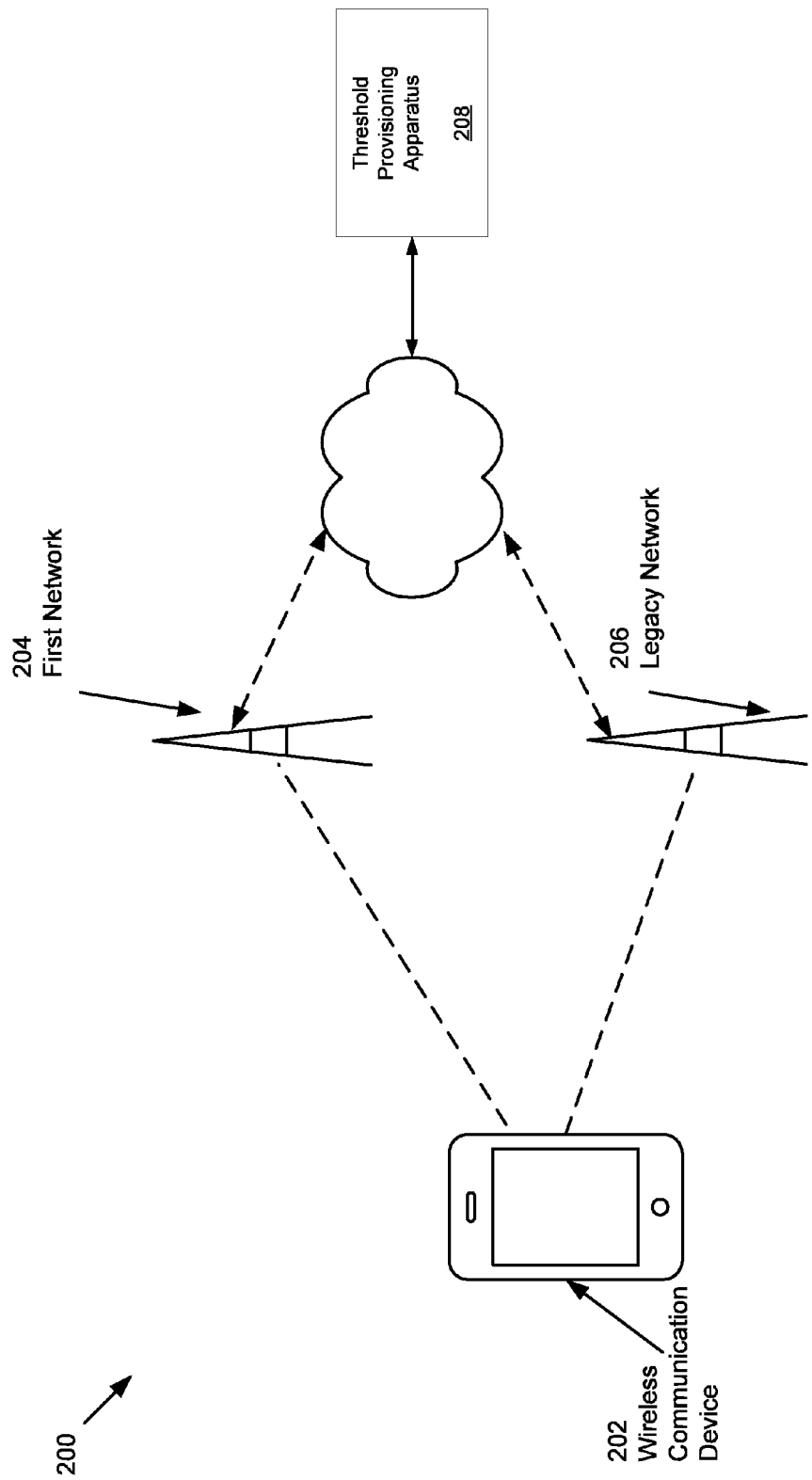
FIG. 2 illustrates a wireless communication system in accordance with some example embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device, a tablet computing device, a laptop computing device, or other computing device configured to operate within both a first network 204 and a legacy network 206. In some example embodiments, such as those in which the first network 204 is an LTE network, the wireless communication device 202 can be referred to as user equipment (UE). The first network 204 can be any network supporting packet switched (PS) data sessions, and can higher data rates than the legacy network 206. However, the first network 204 can be a network that does not support CS voice calls. Thus, for example, the first network 204 can be an LTE or other 4G network, such as the 4G network 102 illustrated in FIG. 1. The legacy network 206 can be any network supporting CS voice calls. However, the legacy network 206 may have lower data rates than the first network 204. By way of non-limiting example, the legacy network 206 can be a UMTS or other 3G network, a GSM or other 2G network, or other legacy network that can support CS voice calls, but that has lower data rates than the first network 204. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. Accordingly, the wireless communication device 202 can connect to the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to the legacy network 206 so that the voice call can be serviced. The CSFB procedure can, for example, be performed as defined in Third Generation Partnership Project (3GPP) TS 23.272 Version 11.2.0 (Sep. 14, 2002), the contents of which are disclosed herein by reference in its entirety. It will be appreciated, however, that the CSFB procedure can additionally or alternatively be performed in accordance with one or more previous and/or future versions of 3GPP TS 23.272. Further, in some example embodiments, the CSFB procedure can be performed in accordance with existing or future methodologies for performing a CSFB procedure that may be performed or promulgated by bodies other than 3GPP.

In some example embodiments, the system 200 can optionally further include a threshold provisioning apparatus 208. In embodiments including a threshold provisioning apparatus 208, the threshold provisioning apparatus 208 can, for example, be a network carrier-managed entity that can implement a carrier database in accordance with some example embodiments. The threshold provisioning apparatus 208 can, for example, be embodied as a one or more servers, a cloud computing infrastructure, or other computing entity. As will be described further herein below, the threshold provisioning apparatus 208 can be a network entity that in some example embodiments can collect data regarding a time taken to place successive voice calls following a call failure on a network (e.g., the legacy network 206 and/or other network). The threshold provisioning apparatus 208 of such example embodiments can process this data to derive threshold barring periods that can be provisioned to devices such as the wireless communication device 202 operating on the first network 204 and/or on the legacy network 206. In this regard, the threshold provisioning apparatus 208 can be accessible over one or both of the first network 204 and the legacy network 206 to enable the wireless communication device 202 to obtain a threshold barring period(s) in embodiments in which threshold barring periods are provisioned to the wireless communication device 202 by a network.

Figure 3:
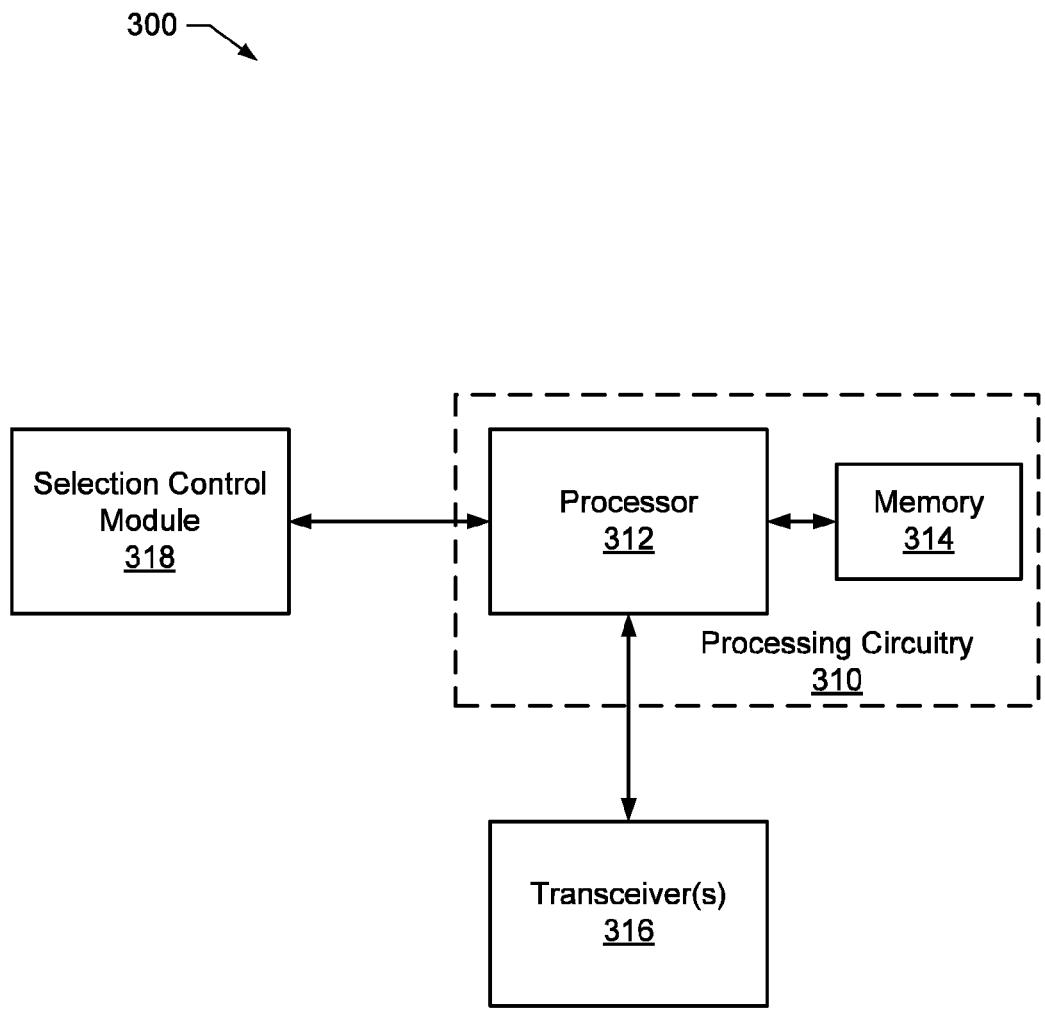
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first network 204 and/or the legacy network 206.

In some example embodiments, the processing circuitry 310 can include a processor 312 and, in some embodiments, such as that illustrated in FIG. 3, can further include memory 314. The processing circuitry 310 can be in communication with or otherwise control a transceiver(s) 316 and/or selection control module 318.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, or selection control module 318 via a bus(es) for passing information among components of the apparatus 300.

The apparatus 300 can further include transceiver(s) 316. The transceiver(s) 316 can enable the apparatus 300 to send wireless signals to and receive signals from one or more wireless networks, such as the first network 204 and the legacy network 206. As such, the transceiver(s) 316 can be configured to support any type of cellular or other wireless communication technology that may be implemented by the first network 204 and/or legacy network 206. In some example embodiments, the transceiver(s) 316 can include a single transceiver configured to enable the wireless communication device 202 to connect to both the first network 204 and the legacy network 206. Alternatively, in some example embodiments, the transceiver(s) 316 can include a first transceiver configured to enable the wireless communication device 202 to connect to the first network 204 and a second transceiver configured to enable the wireless communication device 202 to connect to the legacy network 206.

The apparatus 300 can further include selection control module 318. The selection control module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the selection control module 318.

Figure 4:
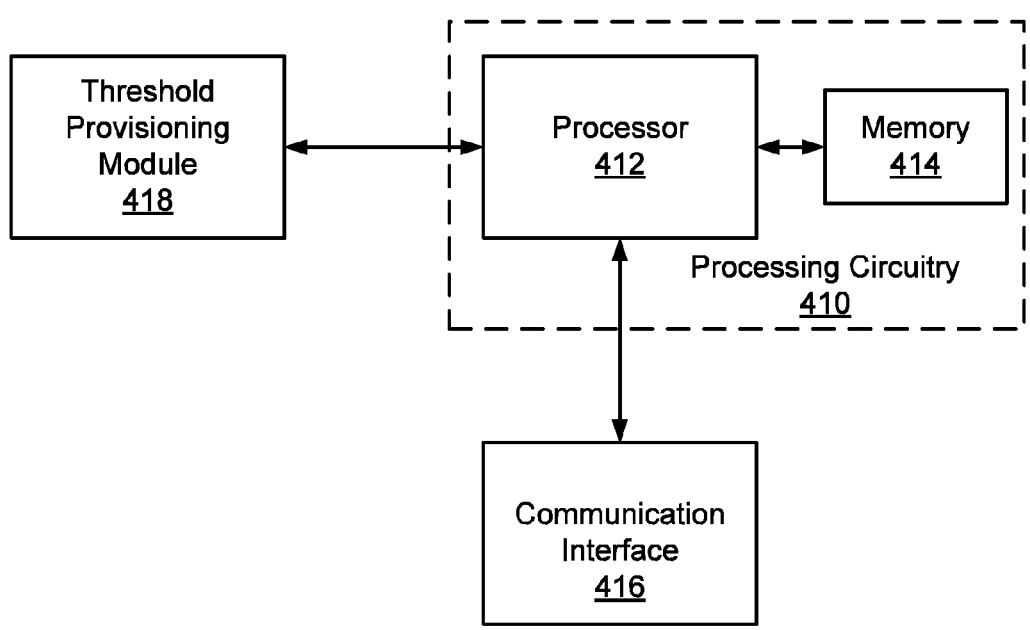
FIG. 4 illustrates a block diagram of a threshold provisioning apparatus in accordance with some example embodiments

FIG. 4 illustrates a block diagram of a threshold provisioning apparatus 208 in accordance with some example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the threshold provisioning apparatus 208 can include processing circuitry 410 that is configurable to perform actions in accordance with one or more example embodiments disclosed herein. In this regard, the processing circuitry 410 can be configured to perform and/or control performance of one or more functionalities of the threshold provisioning apparatus 208 in accordance with various example embodiments, and thus can provide means for performing functionalities of the threshold provisioning apparatus 208 in accordance with various example embodiments. The processing circuitry 410 can be configured to perform data processing, application execution and/or other processing and management services according to one or more example embodiments.

In some embodiments, the threshold provisioning apparatus 208 or a portion(s) or component(s) thereof, such as the processing circuitry 410, can include one or more chipsets, which can each include one or more chips. The processing circuitry 410 and/or one or more further components of the threshold provisioning apparatus 208 can therefore, in some instances, be configured to implement an embodiment on a single chip or chipset.

In some example embodiments, the processing circuitry 410 can include a processor 412 and, in some embodiments, such as that illustrated in FIG. 4, can further include memory 414. The processing circuitry 410 can be in communication with or otherwise control a communication interface 416 and/or threshold provisioning module 418.

The processor 412 can be embodied in a variety of forms. For example, the processor 412 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the threshold provisioning apparatus 208 as described herein. In embodiments including a plurality of processors, the processors can be implemented on a single computing device, or can be distributed across a plurality of computing devices that can be collectively configured to provide functionality of the threshold provisioning apparatus 208 in accordance with some example embodiments. In some example embodiments, the processor 412 can be configured to execute instructions that can be stored in the memory 414 that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. In embodiments including multiple memory devices, the memory devices can be implemented on a single computing device, or can be distributed across a plurality of computing devices that can be collectively configured to provide functionality of the threshold provisioning apparatus 208 in accordance with some example embodiments. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the threshold provisioning apparatus 208 to carry out various functions in accordance with one or more example embodiments. In some embodiments, the memory 414 can be in communication with one or more of the processor 412, communication interface 416, or threshold provisioning module 418 via a bus(es) for passing information among components of the threshold provisioning apparatus 208.

The threshold provisioning apparatus 208 can further include a communication interface 416. The communication interface 416 can enable the threshold provisioning apparatus 208 to communicate with one or more wireless communication devices 202 over the first network 204 and/or over the legacy network 206. In this regard, the communication interface 416 can include one or more interface mechanisms for enabling communication with other devices and/or networks. As such, the communication interface 218 can include, for example, an antenna (or multiple antennas) and supporting hardware and/or software for enabling communications with a wireless communication network (e.g., a cellular network, WSN, and/or the like) and/or a communication modem or other hardware/software for supporting communication via cable, digital subscriber line (DSL), universal serial bus (USB), Ethernet or other wireline networking methods.

The threshold provisioning apparatus 208 can further include threshold provisioning module 418. The threshold provisioning module 418 can be embodied as various means, such as circuitry, hardware, a computer program product comprising computer readable program instructions stored on a computer readable medium (for example, the memory 414) and executed by a processing device (for example, the processor 412), or some combination thereof. In some embodiments, the processor 412 (or the processing circuitry 410) can include, or otherwise control the threshold provisioning module 418.

The selection control module 318 can be configured in some example embodiments to determine an occurrence of a call failure of a voice call (e.g., a circuit switched voice call) for which a CSFB procedure was performed to transition from the first network 204 to the legacy network 206. The call failure can, for example, be a call drop, a call setup failure, or other condition resulting in premature termination of the voice call. In response to the call failure, the selection control module 318 can be configured to bar reselection to the first network 204 for a threshold barring period. For example, the selection control module 318 can set a timer having a time period corresponding to the threshold barring period in response to the call failure and can bar reselection to the first network 204 until expiry of the timer.

The threshold barring period can, for example, have a preconfigured constant length. Additionally or alternatively, as will be described further herein below, the length of the threshold barring period can be derived by the selection control module 318 based at least in part on one or more conditions relating to the failed voice call, such as a state of the wireless communication device 202 at the time of the call failure, a duration of the voice call, a relationship between parties to the voice call, and/or other factors that can influence a likelihood that a successive voice call will be initiate and/or an amount of time that it may take to establish a successive voice call following the call failure. In some example embodiments, the threshold barring period can be provisioned by and/or derived from information that can be provisioned by the threshold provisioning apparatus 208 in accordance with some example embodiments.

It will be appreciated that barring reselection for the threshold barring period can include any of a variety of actions that can prevent the wireless communication device 202 from transitioning back to the first network 204. In some example embodiments, idle mode measurement of the first network 204 can be prevented during the threshold barring period such that the wireless communication device 202 cannot take a measurement of and transition to the first network 204 until after the threshold barring period.

Figure 5:
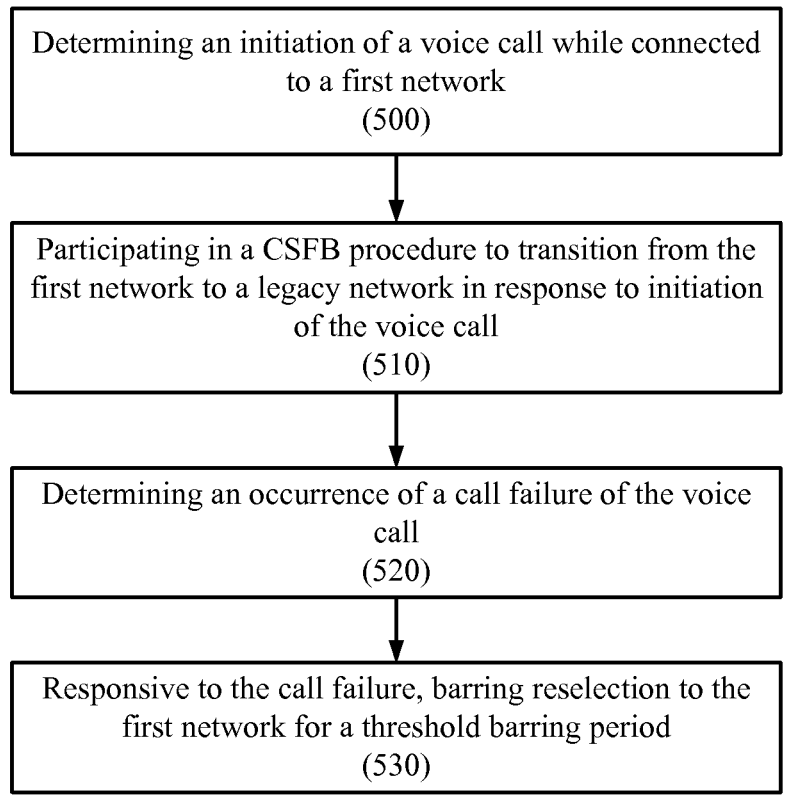
FIG. 5 illustrates a flowchart according to an example method for delaying network reselection following performance of a CSFB procedure in a call failure scenario according to some example embodiments.

FIG. 5 illustrates a flowchart according to an example method for delaying network reselection following performance of a CSFB procedure in a call failure scenario according to some example embodiments. Operation 500 can include determining an initiation of a voice call while connected to the first network 204. One or more of processing circuitry 310, processor 312, memory 314, transceiver(s) 316, or selection control module 318 can, for example, provide means for performing operation 500. Operation 510 can include participating in a CSFB procedure to transition from the first network 204 to the legacy network 206 in response to initiation of the voice call. One or more of processing circuitry 310, processor 312, memory 314, transceiver(s) 316, or selection control module 318 can, for example, provide means for performing operation 510. Operation 520 can include determining an occurrence of a call failure of the voice call. One or more of processing circuitry 310, processor 312, memory 314, transceiver(s) 316, or selection control module 318 can, for example, provide means for performing operation 520. Operation 530 can include barring reselection to the first network for a threshold barring period in response to the call failure. One or more of processing circuitry 310, processor 312, memory 314, transceiver(s) 316, or selection control module 318 can, for example, provide means for performing operation 530.

Figure 6:
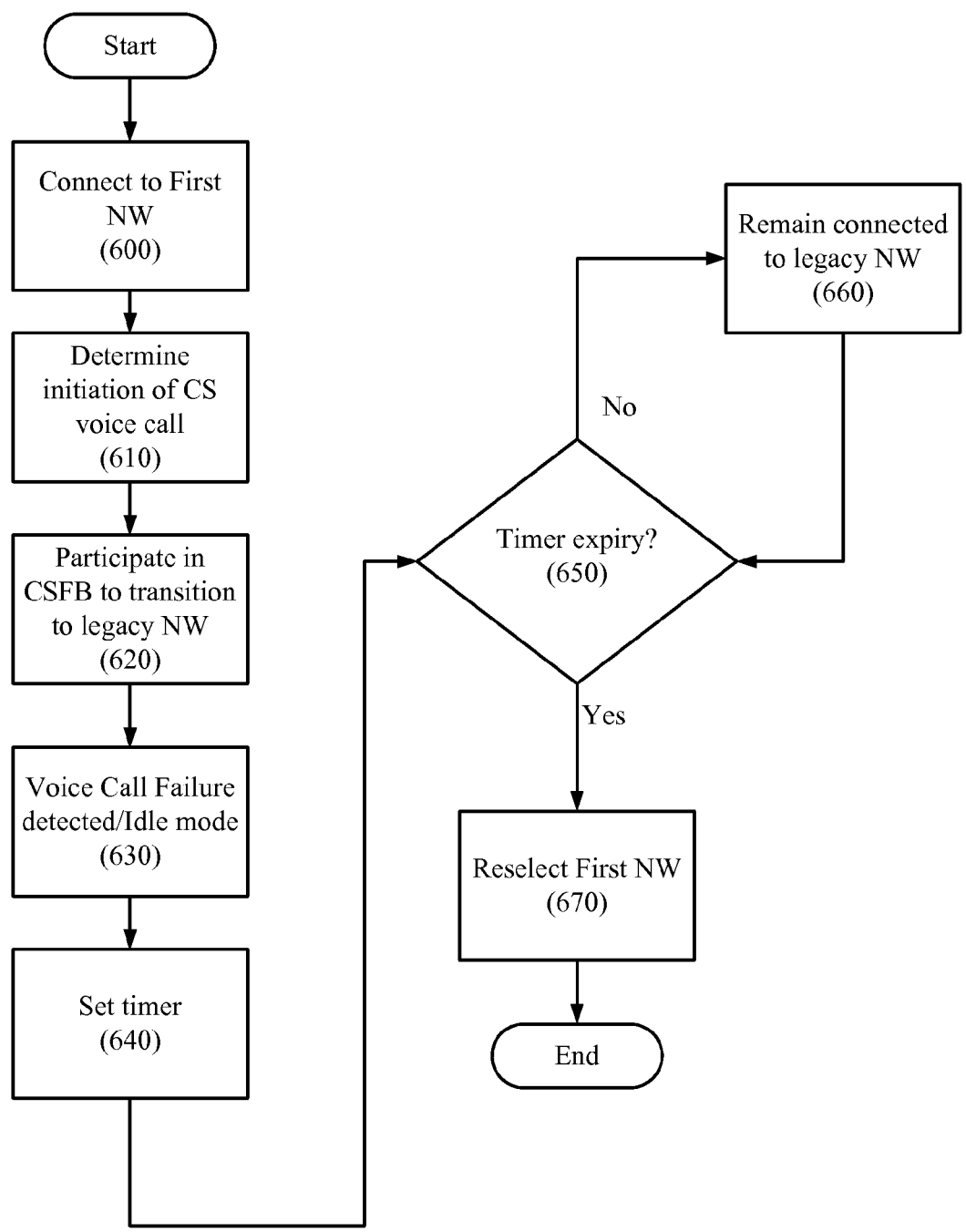
FIG. 6 illustrates a flowchart according to another example method for delaying network reselection following performance of a CSFB procedure in a call failure scenario according to some example embodiments.

FIG. 6 illustrates a flowchart according to another example method for delaying network reselection following performance of a CSFB procedure in a call failure scenario according to some example embodiments. Operation 600 an include connecting to the first network 204. One or more of processing circuitry 310, processor 312, memory 314, transceiver(s) 316, or selection control module 318 can, for example, provide means for performing operation 600. At operation 610, initiation of a voice call can be determined. In this regard, operation 610 can include receiving a page for an incoming (e.g., mobile terminating) voice call. Alternatively, the wireless communication device 202 or user thereof can wish to establish a voice call and operation 610 can include determining initiation of an outgoing (e.g., mobile originating) voice call at the wireless communication device 202. One or more of processing circuitry 310, processor 312, memory 314, transceiver(s) 316, or selection control module 318 can, for example, provide means for performing operation 610. The first network 204 may not support voice calls, but the wireless communication device 202 can be operating in an overlapping service area in which the wireless communication device 202 can also connect to the legacy network 206. As such, operation 620 can include participating in a CSFB procedure to transition to the legacy network 204 so that the voice call can be handled as a CS voice call by the legacy network 206. The voice call can then proceed (assuming call setup is successful) over the legacy network 206 following execution of the CSFB procedure. One or more of processing circuitry 310, processor 312, memory 314, transceiver(s) 316, or selection control module 318 can, for example, provide means for performing operation 620.

Operation 630 can include detecting a voice call failure, and the wireless communication device 202 can transition to an idle mode. Call failure can be detected by the wireless communication device 202, and can arise from any number of possible reasons such as, but not limited to, radio link failure, call rejection, uplink failure, busy equipment, or a missed call. One or more of processing circuitry 310, processor 312, memory 314, transceiver(s) 316, or selection control module 318 can, for example, provide means for performing operation 630. Operation 640 can include setting a timer in response to the call failure. The timer can have a period coinciding with a threshold barring period for which the wireless communication device 202 can be barred from reselecting to the first network 204. The timer can be configured by software, hardware, Firmware of the like. In some example embodiments, the timer can be configured remotely through a wireless connection. One or more of processing circuitry 310, processor 312, memory 314, transceiver(s) 316, or selection control module 318 can, for example, provide means for performing operation 640.

In operation 650, the timer can be checked and inspected for expiry. One or more of processing circuitry 310, processor 312, memory 314, transceiver(s) 316, or selection control module 318 can, for example, provide means for performing operation 650. If the timer has not expired, then the wireless communication device 202 can remain connected to the legacy network 206, as illustrated by operation 660, and the method can repeat by returning to operation 650. On the other hand, if the timer does expire, then in operation 670, the process to reselect the faster, first network 204 can begin. For example, operation 670 can include measuring for existence of the first network 204, such as by measuring for existence of an LTE network. If the first network is determined to exist through measurement, a registration process can begin in which the wireless communication device 202 can send a radio resource control connection request (RRC.connection.request) to the first network 204. In some embodiments, the conclusion of the registration process can include the wireless communication device 202 sending a tracking area update (TAU) request to the first network 204 and the first network 204 sending a TAU accept message to the wireless communication device 202. One or more of processing circuitry 310, processor 312, memory 314, transceiver(s) 316, or selection control module 318 can, for example, provide means for performing operation 670.

In some embodiments, if a loss of service is detected while the timer is running (e.g., within the loop created by operations 650 and 660), the wireless communication device 202 can immediately begin a reselection process. This reselection process can include scanning for the first network 204 and/or for the legacy 206 and connecting to at least one network.

In some embodiments, the network (e.g., the first network 204 and/or the legacy network 206) can take priority over the configuration of the wireless communication device 202 and direct the wireless communication device 202 to reselect a network. In other words, the network can override the timer and direct the wireless communication device 202 to register to the first network 204 or legacy network 206 even if the threshold barring period has not yet expired following a call failure.

Figure 7:
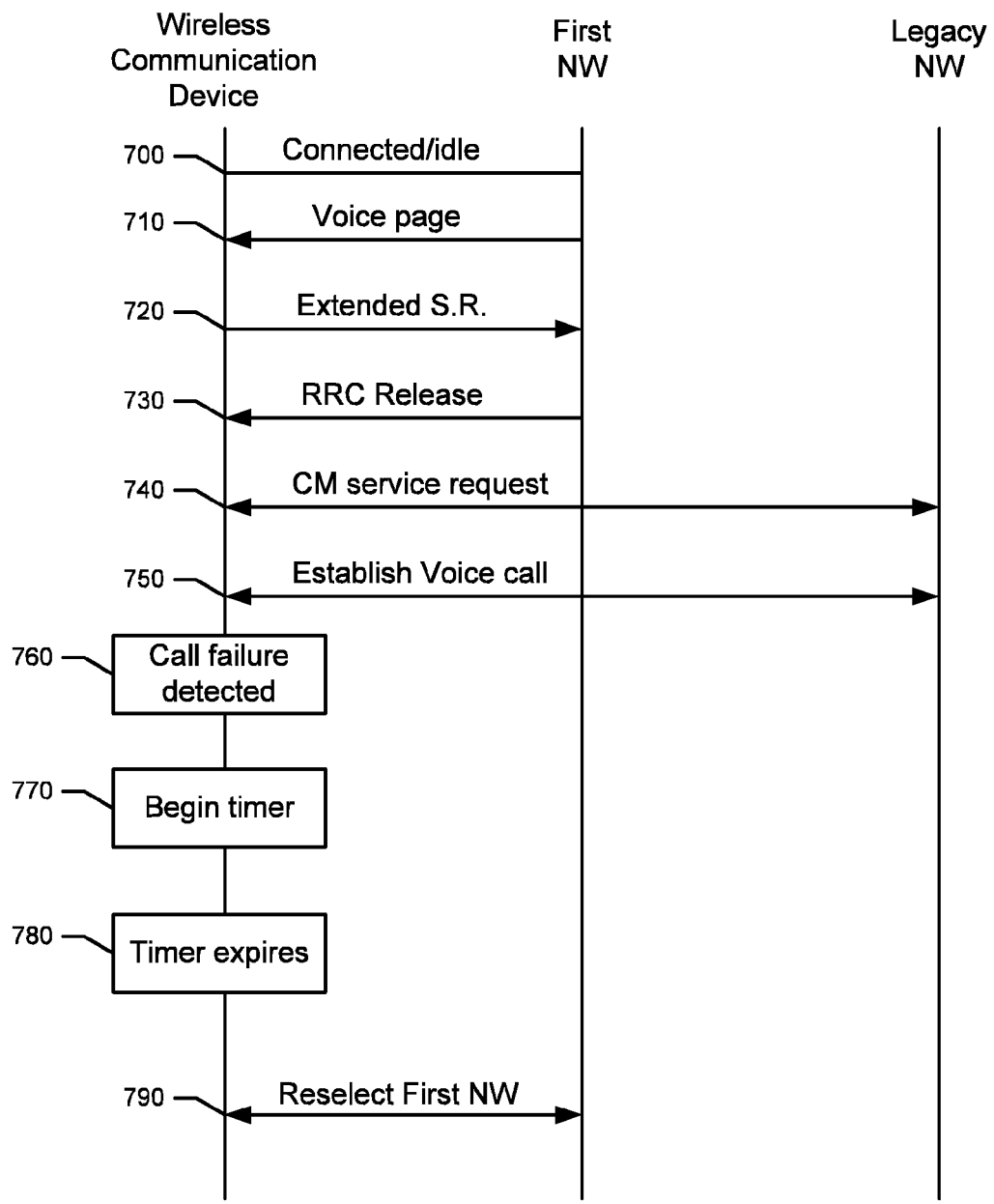
FIG. 7 illustrates an example connection diagram illustrative of connections between entities of the system of FIG. 2 attendant to delaying network reselection following performance of a CSFB procedure in a call failure scenario according to some example embodiments.

FIG. 7 illustrates an example connection diagram illustrative of connections between entities of the system of FIG. 2 attendant to delaying network reselection following performance of a CSFB procedure in a call failure scenario according to some example embodiments. The example of FIG. 7 can represent an example embodiment in which the first network 204 is an LTE network. The example begins with the wireless communication device 202 connected to the first network 204 in an idle state, as illustrated by reference 700. A voice call can then be initiated. For example, operation 710 can include the wireless communication device 202 receiving a voice page for an incoming voice call. Alternatively, operation 710 can be omitted in instances in which the voice call is originated by the wireless communication device 202. Since voice calls are not supported in the currently connected first network 204, the wireless communication device 202 can issue an extended service request to the first network 204. In response, the first network 204 can direct the wireless communication device 202 at operation 730 to release a connection with the first network by sending a Radio Resource Control (RRC) release message (e.g., a RRC.connection.release message) and can provide the wireless communication device 202 with a scanning frequency for the legacy network 206 so that the device can connect to the legacy network 206 for handling the voice call.

Operation 740 can include the wireless communication device 202 sending a connection management (CM) service request to the legacy network, and a voice call can be established over the legacy network 206 at operation 750. The wireless communication device 202 can detect a call failure at operation 760. The call failure can be the result of, but not limited to a radio link failure, call rejection, busy equipment, uplink failure, missed call etc. In response, to the call failure, the wireless communication device 202 can transition to an idle state and also begin a timer coinciding with a threshold barring period at operation 780. While the timer is running, the wireless communication device 202 can postpone reselection to the first network 204. When the time expires (operation 780), the wireless communication device 202 can resume perform a reselection to the first network 204, such as illustrated by operation 790. In some embodiments in which the first network 204 is an LTE network, the reselection process can include measuring LTE network characteristics, registering the wireless communication device 202 with the LTE network, sending a TAU request, and receiving a TAU accept message.

The threshold barring period can, for example, be configured as a static time. For example, in some embodiments, the threshold barring period can be preset to 60 seconds. The threshold barring period can, for example, be determined empirically from historic data indicative of a time taken to establish a successive voice call following a call failure in one or more previous call failure scenarios on the wireless communication device 202 and/or across multiple users and devices on the network. Alternatively, as will be discussed further herein below, the threshold barring period can be determined on the basis of one or more conditions, such as call conditions, a location of the wireless communication device 202, a state of the wireless communication device 202 at a time at which a call is dropped or the like. Regardless of whether the threshold barring period is a static time or is selected on the basis of one or more conditions for a particular call failure scenario, the threshold barring period can be set at a time attempting to balance between unnecessary signaling that can occur if the threshold barring period is too short and unnecessary quality of service degradation that can occur if the threshold barring period is too long. In this regard, FIGS. 8A, 8B, and 8C illustrate scenarios that can occur with various relative threshold barring period lengths in a situation in which a wireless communication device camped on an LTE network via an Evolved Universal Terrestrial Radio Access Network (E-UTRAN) performs a CSFB to connect to a legacy UMTS network via a Universal Terrestrial Radio Access Network (UTRAN).

Figure 8A:
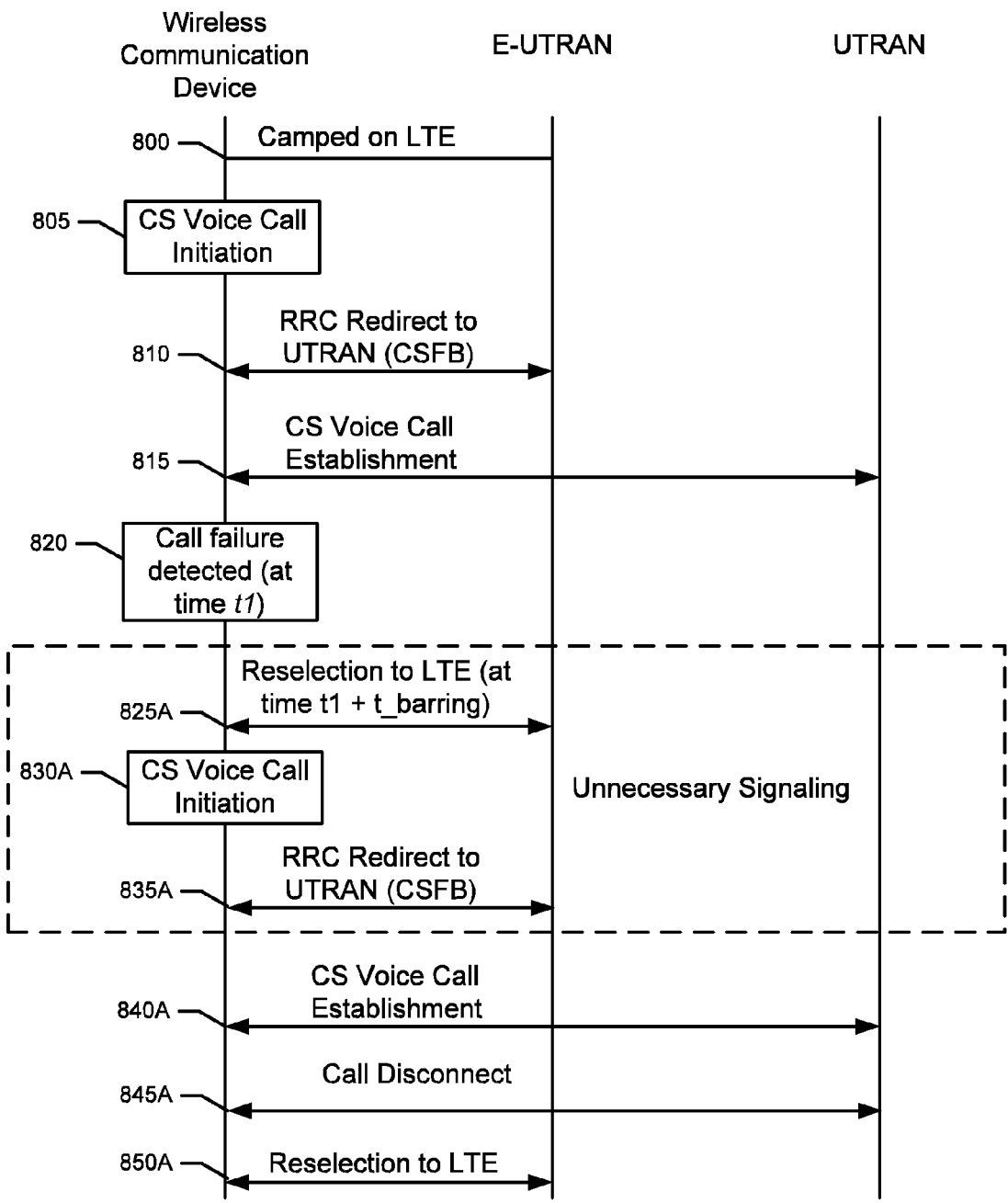
FIG. 8A illustrates unnecessary signaling that can occur if a barring threshold that is too short is used.

Referring first to FIG. 8A, FIG. 8A illustrates unnecessary signaling that can occur if a barring threshold that is too short is used. At time 800, the wireless communication device can be camped on the LTE network. At time 805, the wireless communication device can detect initiation of a voice call requiring CS support. At time 810, the wireless communication device can be directed to perform a CSFB to transition to the UTRAN access via an RRC redirect from the E-UTRAN. The CS voice call can be established over the UTRAN at time 815. Failure of the call can be detected at time 820, referred to as time t1. At time 825A, the wireless communication device can perform a reselection to LTE and connect to the LTE network via the E-UTRAN. Time 825A can correspond to time $t1+t_{Barring}$, with $t_{Barring}$ being notation for the threshold barring period in this example. Accordingly, reselection to LTE can be performed in this example at a time $t_{Barring}$ after the time of the call failure. At time 830A, a second voice call initiation can be detected and, at time 835A, a second CSFB procedure can be performed in response to the second voice call. The second voice call can be established over the UTRAN at time 840A and call disconnection can occur at time 845A. At time 850A, the wireless communication device can perform a reselection to LTE following disconnection of the second voice call. As illustrated in FIG. 8A, the signaling between 825A and 835A can be unnecessary due to setting the $t_{Barring}$ value to too short of a time. In this regard, premature timeout of $t_{Barring}$ in the example of FIG. 8A can cause the wireless communication device to reselect to LTE and perform TAU procedure unnecessarily due to initiation of the successive voice call following a call failure on the UTRAN. This premature timeout can cause excess battery consumption for the wireless communication device and unnecessary signaling both for the wireless communication device and the network.

Figure 8B:
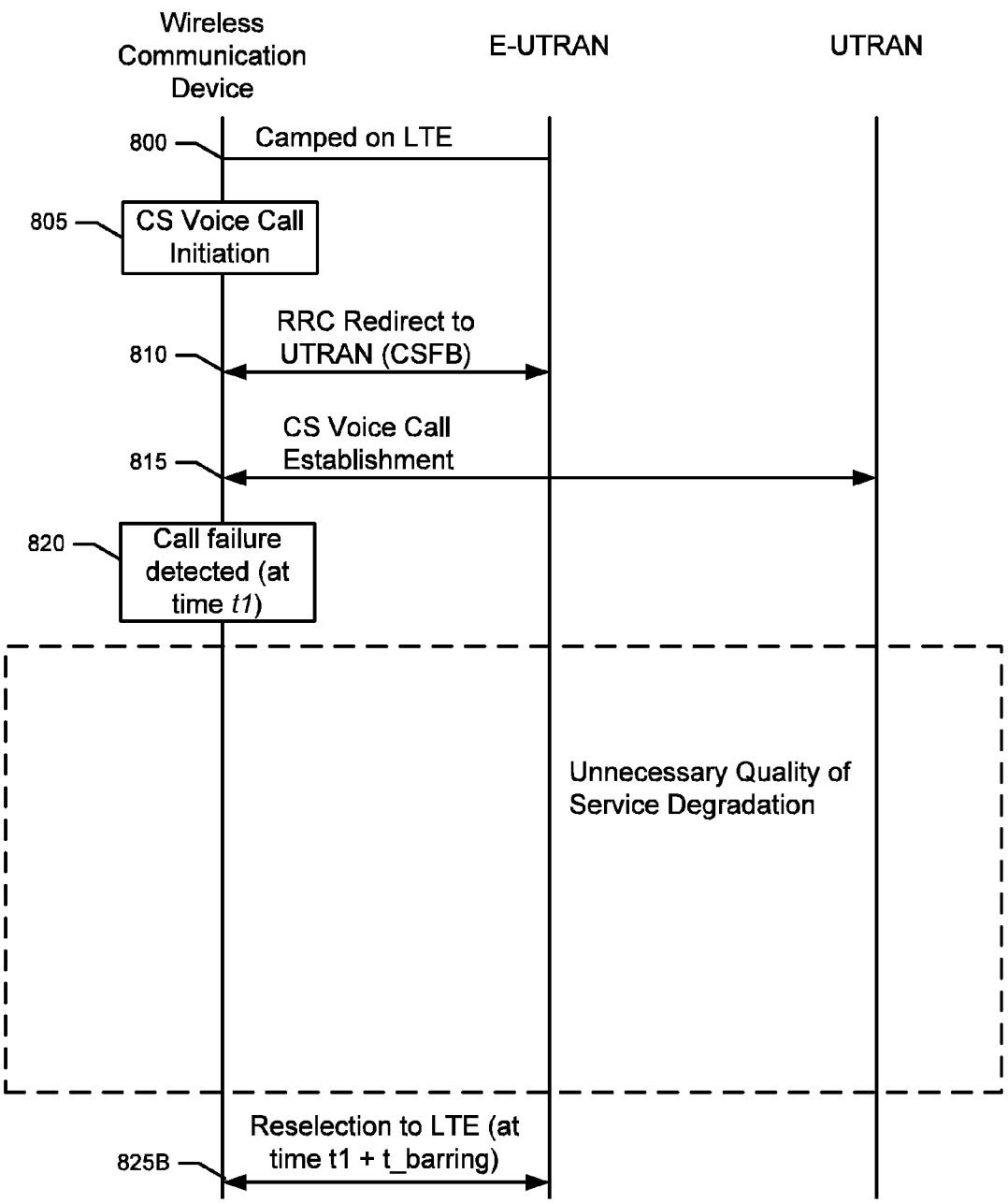
FIG. 8B illustrates quality of service degradation that can occur if a barring threshold that is too long is used.

FIG. 8B illustrates quality of service degradation that can occur if a barring threshold that is too long is used. In this regard, FIG. 8B illustrates a scenario opposite to that in FIG. 8A, in which the $t_{Barring}$ value is set to too long of a time and a successive voice call does not occur. Signaling occurring at times 800-820 can correspond to that illustrated in and described with respect to FIG. 8A. However, as illustrated in FIG. 8B, unnecessary quality of service (QoS) degradation can occur during the time prior to expiration of $t_{Barring}$ at time 825B (e.g., time $t1+t_{Barring}$) in which the wireless communication device remains connected to the UTRAN, which provides lower data rates than the LTE network. In this regard, where a successive voice call is not established and there is an ongoing data session or the user wishes to start a data session, that data session can suffer from low QoS due to the limitations of legacy network (e.g., UTRAN/GERAN) PS radio access bearers instead of using an LTE evolved packet system (EPS) bearer for the PS data session. In some example embodiments, the selection control module 318 can be configured to at least in part avoid the scenario illustrated in FIG. 8B by allowing reselection to the first network 204 even if the threshold barring period has not yet expired in an instance in which a data session is initiated following a call failure.

Figure 8C:
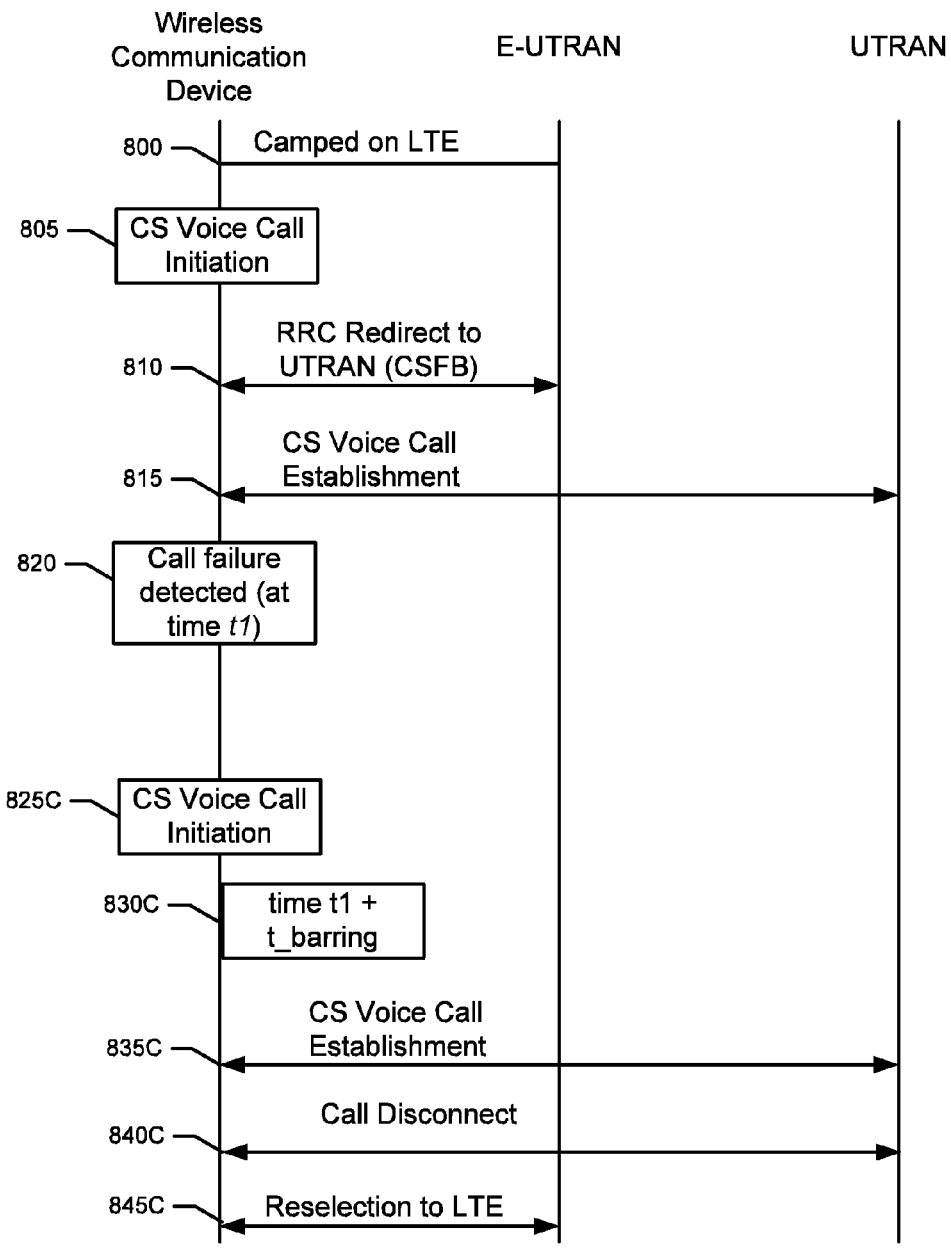
FIG. 8C illustrates a connection diagram using an optimal barring threshold according to some example embodiments.

FIG. 8C illustrates a connection diagram using an optimal barring threshold according to some example embodiments. Signaling occurring at times 800-820 can correspond to that illustrated in and described with respect to FIG. 8A. However, as illustrated in FIG. 8C, in the case of an optimal barring threshold, initiation of the successive voice call at time 825C precedes expiration of $t_{Barring}$ at time 830C (e.g., time $t1+t_{Barring}$). Accordingly, in the example of FIG. 8C, establishment of the voice call at time 835C can be performed without requiring performance of a second CSFB procedure, as the premature reselection scenario illustrated in FIG. 8A has been avoided.

Accordingly, in some example embodiments, the threshold barring period can be selected to avoid premature reselection, as well as to avoid prolonged QoS degradation in scenarios in which a successive voice call is not initiated. In some example embodiments, historical data indicative of a time taken to establish a successive voice call following a call failure in a previous call failure scenario(s) for the wireless communication device 202 and/or for one or more further network users or devices can be used to influence selection of the threshold barring period. Further, in some example embodiments, one or more conditions can be used to influence a dynamic selection of the threshold barring period.

For example, conditions related to a state of the wireless communication device 202 can be used to select a threshold barring period. As a more particular example, in some example embodiments, the threshold barring period can be determined based at least in part on a state of mobility of the wireless communication device 202. In this regard, the length of the threshold barring period can have an inverse relationship to velocity of the wireless communication device 202, as it may take longer to establish a successive voice call in a scenario in which the wireless communication device 202 is moving.

As a further example, conditions related to the voice call, which can also be referred to as "user conditions," can be taken into account as well in order to influence selection of a threshold barring period. As a more particular example, in some example embodiments, the threshold barring period can be determined based at least in part on duration of the failed voice call. In this regard, the length of the threshold barring period can have a direct relationship to the duration of the voice call, as a user can be more likely to initiate a successive voice call following a call failure in an instance in which a relatively long conversation had taken place prior to call failure as compared to scenarios in which the failed call had a short duration. As another particular example, in some example embodiments, the threshold barring period can determined based at least in part on a previous communication history between parties to the voice call. In this regard, if the parties to the failed call have an established history of engaging in communications, such as via voice calls, video calls, text messaging, emails, and/or the like, a longer threshold barring period can be selected, as placement of a successive call can be more likely than in situations in which parties to the failed call have less of a prior history of exchanging communications with each other. As still a further particular example, in some example embodiments, the threshold barring period can determined based at least in part on whether an opposite party to the failed voice call is in a contact list that can be implemented on the wireless communication device 202. In this regard, if the opposite party to the failed voice call is in the contact list, then it can be determined that placement of a successive voice call following the call failure is more likely, and a longer threshold barring period can be selected than in an instance in which the opposite party is not in the contact list. As yet another example, in some example embodiments, a longer threshold barring period can be selected if an opposite party to a failed voice call is a party with a blocked, hidden, or otherwise unknown caller identifier (ID) than for a party whose caller ID is made available to the wireless communication device 202. In this regard, a user can be less likely to make a successive voice call if the opposite party to the call has an unknown caller ID.

In some example embodiments, a longer threshold barring period can be selected in an instance in which the failed voice call is an emergency call (e.g., a call to 911 or other dedicated emergency services number) than for a non-emergency call.

Configuring the threshold barring period dynamically according to each user's conditions in accordance with some example embodiments can be considered under smart radio parameter configuration umbrella. Some dynamic configuration methods disclosed herein can be categorized as a pure statistical approach, where the time it takes a user to establish a voice call after a call failure scenario $t_{successive}$ can be modeled as a random variable. Further, some dynamic configuration methods disclosed herein can be categorized as a holistic approach where the metrics (e.g., conditions) that affect the probability of a voice call establishment after a call failure (e.g., user conditions, conditions related to a state of the wireless communication device, and/or the like) can be analyzed individually and modeled in isolation and/or in combination with a random variable modeling $t_{successive}$.

In some example embodiments using a statistical approach, the threshold barring period can be determined based at least in part on a random variable modeling historical data indicative of a time taken to establish a successive voice call following a call failure in one or more previous call failure scenarios. The random variable modeling the time it takes a user to establish a successive voice call following a call failure scenario can be referred to as $t_{callback}$. The previous call failure scenarios from which the historical data was obtained can, for example, be local to the wireless communication device 202. Additionally or alternatively, in some example embodiments, the historical data can be data collected by the threshold provisioning apparatus 208 from devices using the first network 204 and/or legacy network 206 such that the threshold provisioning module 418 can derive the random variable from collected historical data.

In some example embodiments, a probability distribution (PDF) of $t_{callback}$ can be drawn by the threshold provisioning module 418 by collecting data over various network users (e.g., users of the first network 204 and/or legacy network 206). The PDF of $t_{callback}$ can be referred to as $f(t_{callback})$. Given the PDF of $t_{callback}$, the threshold barring period, $t_{Barring}$, can be determined based at least on a mean of the PDF of $t_{callback}$. In some example embodiments, $t_{Barring}$ can be determined further based on a standard deviation of $t_{callback}$. A sample calculation of that can be performed in accordance with some example embodiments using $t_{callback}$ is as follows:

$$t_{Barring} = E(t_{callback}) + \Delta \quad [1]$$

$$E(t_{callback}) = \int_0^{max\,t_{callback}} t_{callback} * f(t_{callback}) d(t_{callback}) \quad [2]$$

$$\Delta \sim \sigma_{t_{callback}} = \sqrt{\int_0^\infty t_{callback} - E(t_{callback}))^2 f(t_{callback}) d(t_{callback})} \quad [3]$$

In this regard, $E(t_{callback})$ as defined in equation [2] can represent the mean of the PDF of $t_{callback}$ and $\sigma_{t_{callback}}$ can represent the standard deviation of $t_{callback}$. The reason the delta (which is directly proportional to the standard deviation for $t_{callback}$) is added to the mean value in some example embodiments (equation [2]) is to cover major part of the cumulative distribution function (CDF) of $t_{callback}$ without increasing the $t_{Barring}$ unnecessarily. For example, if the PDF of the call back time after a call failure approaches a Gaussian distribution $N(\mu, \sigma)$ with a mean of 10 seconds and variance of 4 seconds versus the case with a variance of 20 seconds, it can be in favor of the overall QoS/Battery consumption tradeoff in CSFB call failure scenarios to set $t_{Barring}$ to higher values where the random variable $t_{callback}$ has higher variance. The upper limit of the integral while finding the expected value of $t_{callback}$ can set to a predefined number max—$t_{callback}$ so that the successive voice calls that are performed significantly later than the call failure incident are not used for calculations. For example, $t_{callback}$ can be defined to be less than 120 seconds in some example embodiments such that successive calls initiated 120 seconds or more following a call failure may not be used for calculations.

In some example embodiments in which the mean of the PDF of $t_{callback}$ (e.g., equation [2]) and/or the standard deviation of $t_{callback}$ (e.g., equation [3]) are used to calculate $t_{Barring}$ (e.g., in accordance with equation [1]), $t_{Barring}$ can, for example, be calculated by the threshold provisioning module 418 and provisioned to the wireless communication device 202. Additionally or alternatively, in some example embodiments, the threshold provisioning module 418 can provision the wireless communication device 202 with $t_{callback}$, the mean of the PDF of $t_{callback}$, and/or the standard deviation of $t_{callback}$, and the selection control module 318 can be configured to calculate $t_{Barring}$ based at least in part on the provisioned value(s). In some example embodiments, $t_{callback}$ and, thus, $t_{Barring}$ can be specific to a call failures scenarios experienced by users within a particular geographic area, such as, by way of example, specific to only the legacy network 206 or portion thereof. Accordingly, in some example embodiments, the wireless communication device 202 can determine and/or be provisioned with a new $t_{Barring}$ in response to the wireless communication device 202 transitioning to a new network or geographic region.

In some example embodiments using a holistic approach, a value of $t_{Barring}$ to apply in a call failure scenario can be selected dynamically on the basis of one or more conditions. The dynamic selection of $t_{Barring}$ can, for example, be based at least in part on a value that can be derived using equations [1], [2], and/or [3]. In some example embodiments, a plurality of $t_{Barring}$ values, such as an array of $t_{Barring}$ values can be calculated by the threshold provisioning module 418 and provisioned to the wireless communication device 202. In this regard, some example embodiments can reduce computational complexity on the part of the threshold provisioning apparatus 208 and/or on the wireless communication device 202. More particularly, in some example embodiments, an array of $t_{Barring}$ values referred to as $T_{Barring}[\ ]$ can be defined. The array can include any number of $t_{Barring}$ values, which can, for example, be derived from the PDF of $t_{callback}$ in accordance with equations [1], [2], and [3]. However, for purposes of non-limiting example, an example implementation using four $t_{Barring}$ values will be described. In this regard, an example array can be defined as:

$$T_{Barring}[\ ]=[t_{low},t_{mid1},t_{mid2},t_{high}] \quad [4]$$

In a more particular example using values that can be derived from equations [1], [2], and [3], an example array can be defined as:

$$T_{Barring}[\ ]=[E(t_{callback})-2\Delta, E(t_{callback})-\Delta, E(t_{callback})+\Delta, E(t_{callback})+2\Delta] \quad [5]$$

In some example embodiments, the threshold provisioning module 418 can calculate an array of $t_{Barring}$ values, such as by using equation [5]. The array can, for example, be specific to a particular network or geographic region. The array can be updated (e.g., periodically) as additional data is collected regarding placement of successive voice calls in call failure scenarios. The wireless communication device 202 can query the threshold provisioning apparatus 208 for the array of $t_{Barring}$ values for use in a call failure scenario and the threshold provisioning apparatus 208 can provision the array of $t_{Barring}$ values to the wireless communication device 202 in response to the query. In some example embodiments, the wireless communication device 202 can, for example, query the threshold provisioning apparatus 208 periodically, and/or in response to a particular event, such as transitioning to a new geographic region or network.

The selection control module 318 of some example embodiments can select a $t_{Barring}$ value from a provisioned array of $t_{Barring}$ values based at least in part on conditions experienced attendant to a call failure. In this regard, user conditions that yield a higher chance of successive voice calls being placed can be used to set the $t_{Barring}$ value to dynamically according to each user's conditions at the time of the call failure. Various example conditions and metrics that can be used to calculate and/or select the $t_{Barring}$ value from an array of $t_{Barring}$ values are described further herein below.

In some example embodiments, a state of the wireless communication device 202, such as a state of mobility of the wireless communication device 202 can be taken into account. In this regard, devices that are in high mobility conditions are less likely to make successive voice calls after call failures. Thus, in high mobility conditions, a lower value of $t_{Barring}$ can be selected. Assuming the wireless communication device 202 has a cellular stack functioning, the maximum Doppler shift observed can be used to determine the velocity of the receiver by:

$$v = \frac{f_{maxDoppler} * C}{fc} \quad [6]$$

The result of equation [6] can, for example, be used in some example embodiments to determine the $t_{Barring}$ value based on $t_{Barring} \sim 1/v$. In some example embodiments in which the wireless communication device 202 has a functioning accelerometer, positioning device (e.g., a Global Positioning System device), and/or the like, a velocity(ies) calculated from these sensors can be used in lieu of and/or to complement a receiver velocity approximated by Doppler shift methods.

In some example embodiments, duration of the failed voice call can be taken into account in selecting a $t_{Barring}$ value. In this regard, if the time between the CS voice call establishment (CC—Connect Ack) and the call failure time is significantly long, there is a high chance of a successive voice call initiation after the call failure. Thus, $t_{Barring}$ can be set to a relatively longer time period, such as one of the higher values in a provisioned array of $t_{Barring}$ values in an instance in which a failed voice call was of a relatively long duration. Call failure can also happen before the CS radio access bearer (RAB) is actually setup like in the case for an area with high congestion where the network can send a CM Service Reject (e.g., Reject Cause: 22—Congestion, 17—Network Failure) and the call would fail even before the setup procedure. In these situations, a user is very likely to try a successive call so, in some embodiments, $t_{Barring}$ may not be set to a short value even though the duration of the failed call is short. The CSFB call duration metric to be used in the decision function shown in can accordingly be measured in some example embodiments starting from the time wireless communication device 202 successfully got redirected to the legacy network 206 instead of starting the measurement from the CC—Connect ACK non-access stratum (NAS) message.

In some example embodiments, a relationship between parties to the failed voice call can be taken into account in selecting a $t_{Barring}$ value. In this regard, if a previous communication history between parties to the failed call indicates that the parties have an established history of engaging in voice calls and/or other communications, such as, video calls, text messaging, emails, and/or the like, a longer $t_{Barring}$ value can be selected. In some example embodiments, the selection control module 318 can check a called/calling party (e.g., the opposite party) BCD number can be checked to see if there is recent communication history between the parties and/or if the number exists in a phonebook that can be implemented on the wireless communication device 202. If the opposite party's number exists in the phone book and/or there is frequent communication with this specific number, there is a relatively high chance of a successive voice call being initiated after the call failure. Accordingly, a longer $t_{Barring}$ value can be selected.

In some example embodiments, the $t_{Barring}$ value can be selected by the selection control module 318 based at least in part on whether the failed call was a mobile originated call or a mobile terminating call. In this regard, if the call was a mobile originated call, there can be a higher chance of a successive voice call being initiated after the call failure, and a longer $t_{Barring}$ value can be selected.

In some example embodiments, the $t_{Barring}$ value can be selected based at least in part on whether the failed call was an emergency call. For example, the Baseband can flag the CSFB call as an emergency call either by RRC-connection request establishment cause or by the GSM-Call-Control Emergency Setup message. If a failed emergency call is detected, a longer $t_{Barring}$ value can be selected. For example, $t_{Barring}$ can be set to the highest value of the $T_{Barring}[\ ]$ array regardless of the user conditions (duration, call history, etc.) due to the importance of emergency calls. In this regard, it can be imperative that the wireless communication device 202 not miss the paging for emergency call back and the trade-off for QoS degradation can be lower priority avoiding missing an emergency call page during a reselection process.

Figure 9:
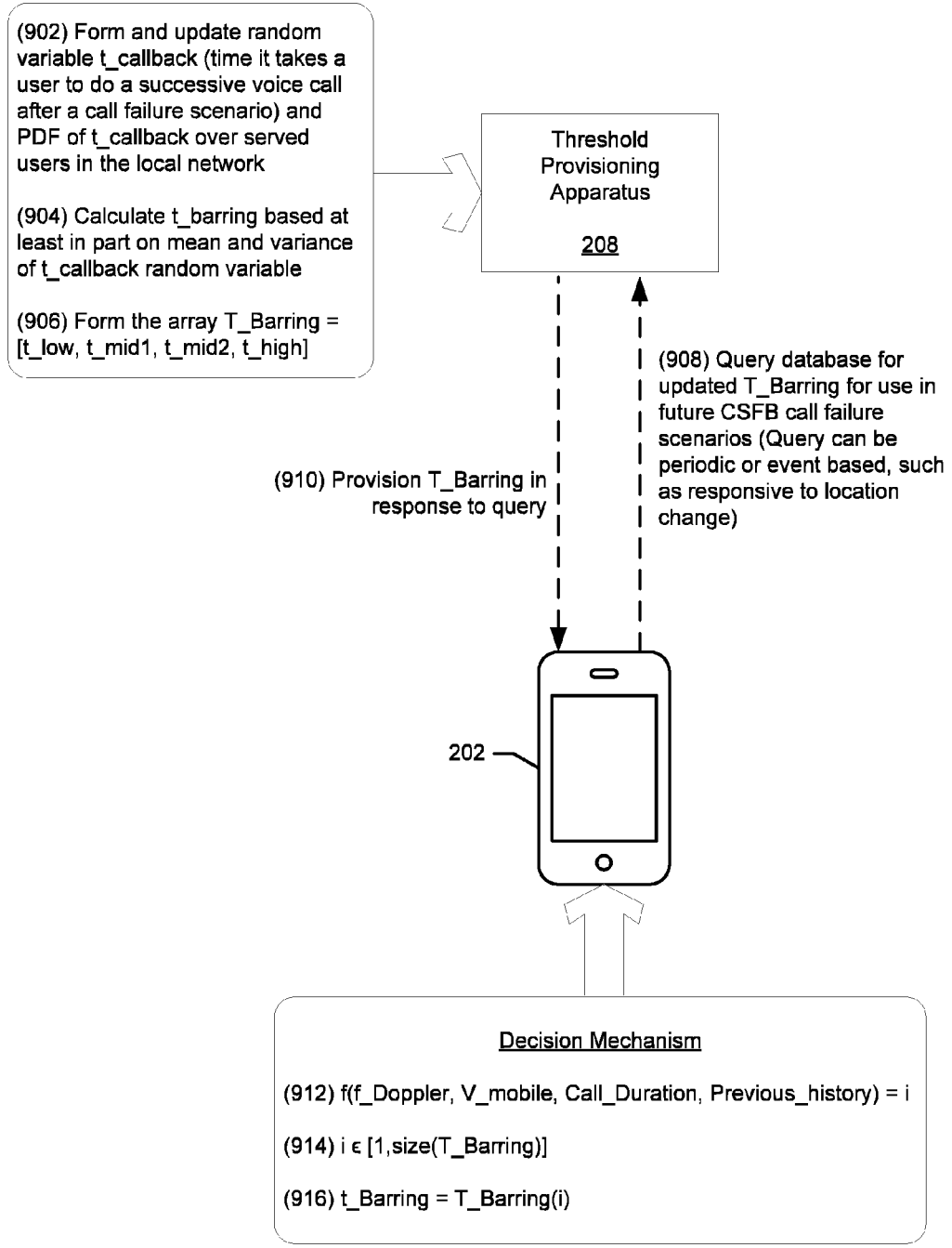
FIG. 9 illustrates provisioning of threshold barring periods and threshold barring period selection according to some example embodiments.

FIG. 9 illustrates provisioning of threshold barring periods and threshold barring period selection according to some example embodiments. In this regard, FIG. 9 illustrates provisioning of a $T_{Barring}$ [ ] array by the threshold provisioning apparatus 208 to the wireless communication device 202 and logic for selecting a $t_{Barring}$ value from the array in accordance with some example embodiments. Operation 902 can include the threshold provisioning module 418 forming and/or updating the random variable $t_{callback}$. Operation 904 can include the threshold provisioning module 418 calculating $t_{Barring}$ values based at least in part on mean and variance of $t_{callback}$. Operation 906 can include the threshold provisioning module 418 forming the $T_{Barring}$ [ ] array from the calculated $t_{Barring}$ values.

Operation 908 can include the wireless communication device 202 querying a database that can be maintained on the threshold provisioning apparatus 208 for a $T_{Barring}$ [ ] array for use in future CSFB call failure scenarios. The query operation can be periodic or event based, such as responsive to a change in location of the wireless communication device 202. Operation 910 can include the threshold provisioning apparatus 208 provisioning the $T_{Barring}$ [ ] array to the wireless communication device 202 in response to the query.

Operations 912-916 illustrate an example decision mechanism that can be performed by the selection control module 318 to select a $t_{Barring}$ value from the $T_{Barring}$ [ ] array in the event of a call failure. Operation 912 can include determining an index value as a function of one or more conditions (e.g., user conditions). By way of non-limiting example, the conditions can include a state of mobility (e.g., velocity) of the wireless communication device 202, a duration of the failed voice call, previous communication history between parties to the call, relationship between parties to the call, and/or other factors described herein. The determination of the index value can, for example, be described as a function:

$$f(f\_Doppler, V\_mobile, Call\_Duration, Previous\_history) = i \quad [7]$$

where "f_Doppler" can describe an observed Doppler shift, "V_mobile" can describe a velocity of the wireless communication device, "Call_Duration" can describe a duration of the voice call, and "Previous_history" can describe a previous communication history and/or other relationship (e.g., whether the opposite party is in a phone book) between parties to the call.

Operations 914 and 916 can include using the index value i calculated in operation 912 to look up the value at that position in the $T_{Barring}$ [ ] array (e.g., $T_{Barring}$ [i]) and set $t_{Barring}$ for the call failure to $T_{Barring}$ [i].

Figure 10:
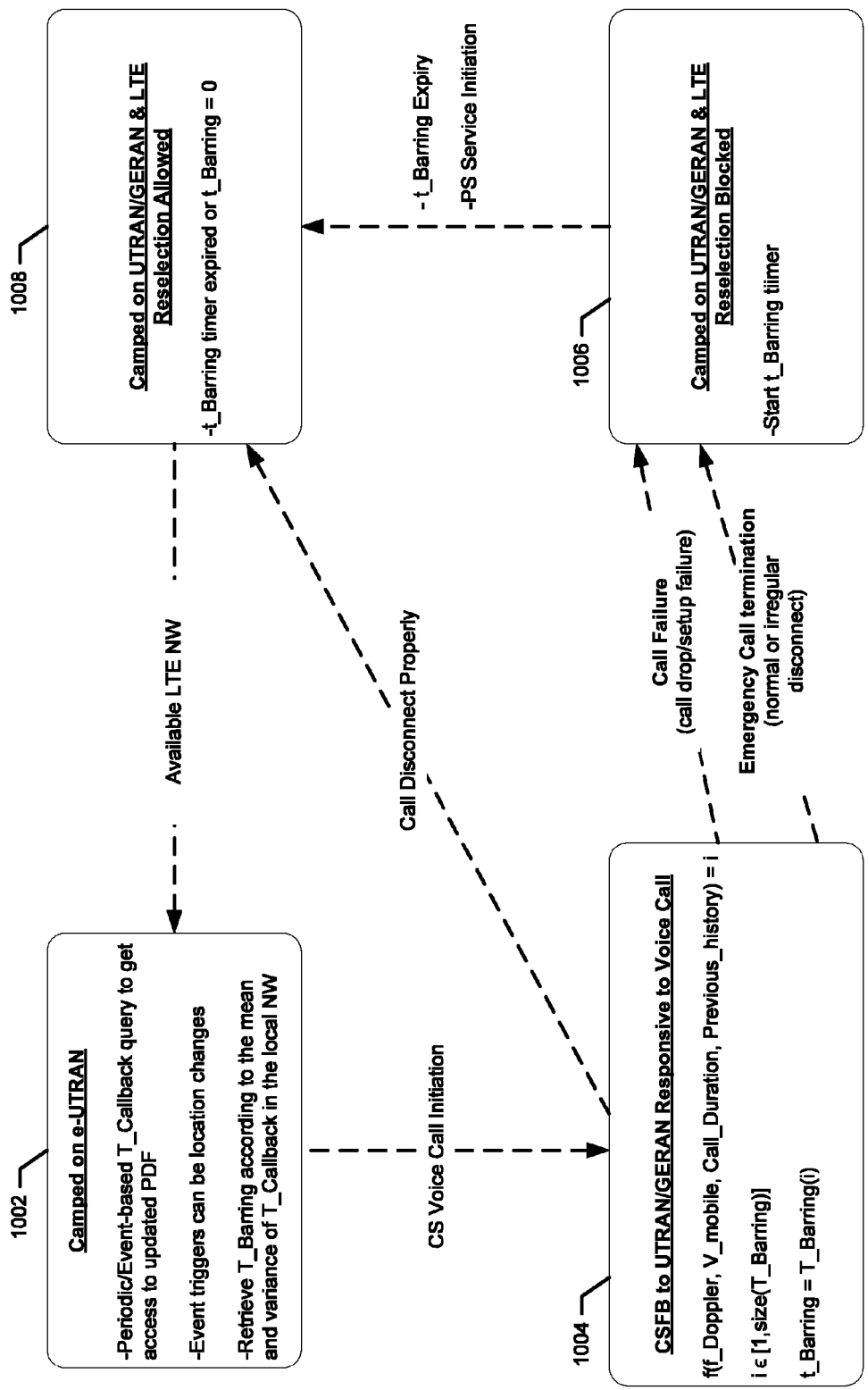
FIG. 10 illustrates a state diagram according to some example embodiments.

FIG. 10 illustrates a state diagram according to some example embodiments. In this regard, FIG. 10 illustrates an example embodiment in which the first network 204 can be an LTE network which the wireless communication device 202 can access through an e-UTRAN and the legacy network 206 can be accessed via a UTRAN/GERAN. At state 1002, the wireless communication device 1002 can be camped on e-UTRAN. The wireless communication device 202 can query (e.g., periodically and/or in response to an event, such as a location change) the threshold provisioning apparatus 208 to get access to an updated $T_{Barring}$ [ ] array and/or information that can be used to derive a $t_{Barring}$ value, such as $t_{callback}$, the PDF of $t_{callback}$, the mean of the PDF of $t_{callback}$, the standard deviation of $t_{callback}$, and/or the like. In some example embodiments, the wireless communication device 202 can query to get a PDF of $t_{callback}$ and use the PDF to calculate a mean and variance of $t_{callback}$ in the local network. The mean and variance of $t_{callback}$ in the local network can be used to retrieve the locally appropriate $T_{Barring}$ [ ] array.

In response to initiation of a CS voice call, the wireless communication device 202 can transition to state 1004, in which the wireless communication device 202 can transition to UTRAN/GERAN access through performance of a CSFB procedure. The $t_{Barring}$ value for use in a call failure scenario can, for example, be selected as described with respect to operations 912-916.

In the event of a call failure, such as a call drop, setup failure, or the like, the wireless communication device 202 can transition from state 1004 to state 1006. Further, in the event of an emergency call termination, which can include both normal and irregular emergency call disconnections in some embodiments, the wireless communication device 202 can transition from state 1004 to state 1006.

At state 1006, the wireless communication device 202 can be camped on the UTRAN/GERAN access with reselection to LTE being barred. The wireless communication device 202 can start a timer corresponding to the $t_{Barring}$ value selected in state 1004. In response to expiry of the timer, the wireless communication device 202 can transition to state 1008. In some example embodiments, if a packet switched service (e.g., a data session) is initiated following call failure, the wireless communication device 202 can transition to state 1008 even if the timer has not yet expired.

At state 1008, the wireless communication device 202 can remain camped on the UTRAN/GERAN access, but reselection to LTE can be allowed. The wireless communication device 202 can accordingly transition from state 1008 to state 1002 as desired, if there is an available LTE network.

Additionally, if a voice call disconnects properly (e.g., does not fail), the wireless communication device 202 can transition from state 1004 to state 1008. In this regard, reselection may not be barred in the event of a proper disconnect of a voice call.

Figure 11:
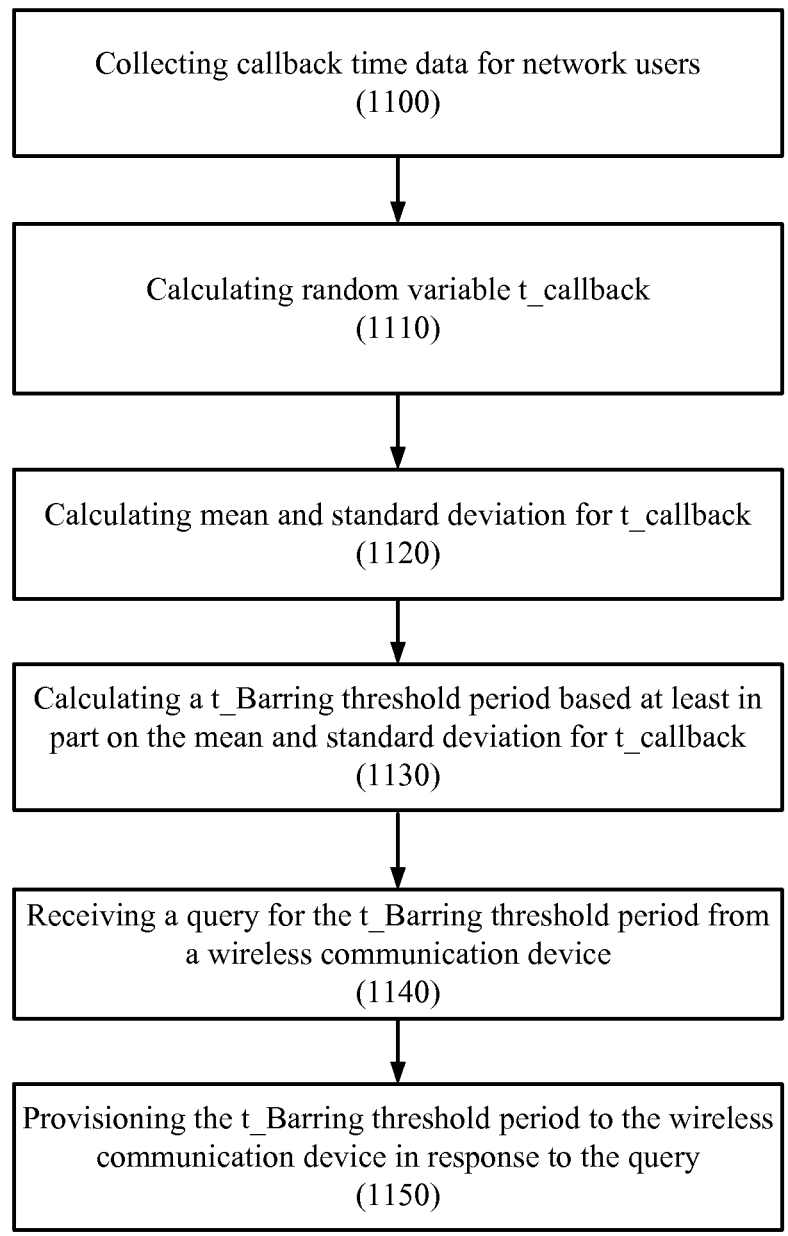
FIG. 11 illustrates a flowchart according to an example method for calculating and provisioning a threshold barring period according to some example embodiments.

FIG. 11 illustrates a flowchart according to an example method for calculating and provisioning a threshold barring period according to some example embodiments. In this regard, FIG. 11 illustrates operations that can be performed by the threshold provisioning apparatus 208. Operation 1100 can include collecting callback time data for network users. The callback time data can be indicative of time taken to establish a successive voice call following a call failure scenario. One or more of processing circuitry 410, processor 412, memory 414, communication interface 416, or threshold provisioning module 418 can, for example, provide means for performing operation 1100. Operation 1110 can include calculating the random variable $t_{callback}$. One or more of processing circuitry 410, processor 412, memory 414, or threshold provisioning module 418 can, for example, provide means for performing operation 1110. Operation 1120 can include calculating a mean and standard deviation for $t_{callback}$. The calculations of operation 1120 can, for example, be performed based at least in part on a PDF of $t_{callback}$. One or more of processing circuitry 410, processor 412, memory 414, or threshold provisioning module 418 can, for example, provide means for performing operation 1120. Operation 1130 can include calculating a $t_{Barring}$ value(s) based at least in part on t the mean and standard deviation calculated in operation 1130. Operations 1120 and 1130 can, for example, be performed in accordance with one or more of equations [1], [2], [3], [4], and [5]. One or more of processing circuitry 410, processor 412, memory 414, or threshold provisioning module 418 can, for example, provide means for performing operation 1130. Operation 1140 can include receiving a query for the $t_{Barring}$ value(s) from a wireless communication device 202. One or more of processing circuitry 410, processor 412, memory 414, communication interface 416, or threshold provisioning module 418 can, for example, provide means for performing operation 1140. Operation 1150 can include provisioning the $t_{Barring}$ value(s) to the wireless communication device 202 in response to the query. One or more of processing circuitry 410, processor 412, memory 414, communication interface 416, or threshold provisioning module 418 can, for example, provide means for performing operation 1150.

Figure 12:
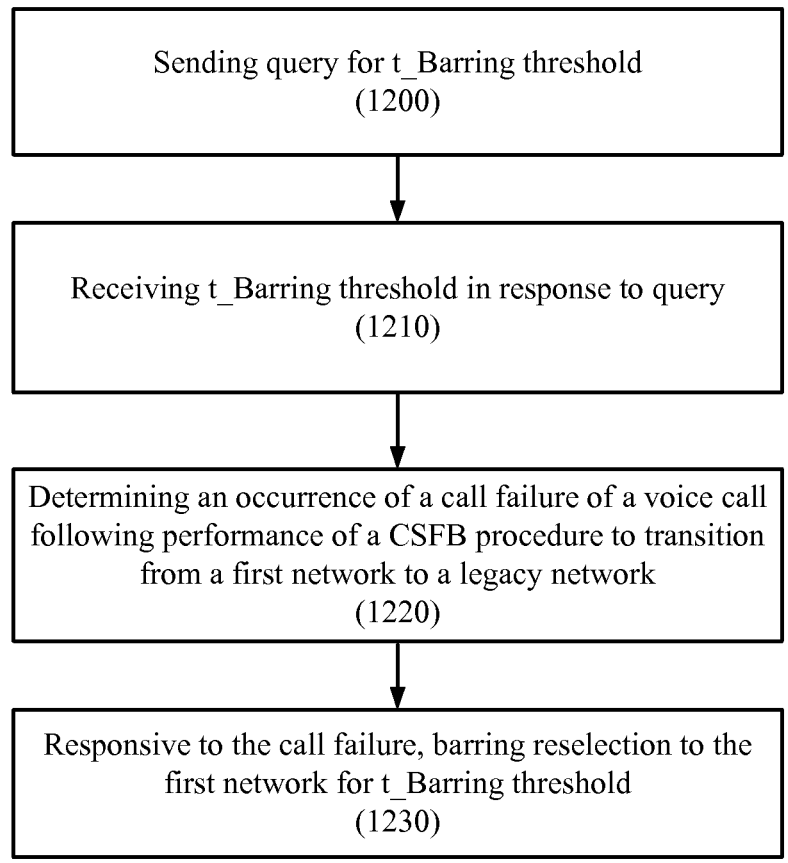
FIG. 12 illustrates a flowchart according to an example method for delaying network reselection following performance of a CSFB procedure in a call failure scenario for a network provisioned threshold barring period according to some example embodiments.

FIG. 12 illustrates a flowchart according to an example method for delaying network reselection following performance of a CSFB procedure in a call failure scenario for a network provisioned threshold barring period according to some example embodiments. In this regard, FIG. 12 illustrates operations that can be performed by a wireless communication device 202. Operation 1200 can include sending a query for a $t_{Barring}$ value, such as to the threshold provisioning apparatus 208. The query can, for example, be periodically occurring and/or can be performed in response to an event, such as a change in location or connecting to a new network. One or more of processing circuitry 310, processor 312, memory 314, transceiver(s) 316, or selection control module 318 can, for example, provide means for performing operation 1200. Operation 1210 can include receiving a $t_{Barring}$ value in response to the query. One or more of processing circuitry 310, processor 312, memory 314, transceiver(s) 316, or selection control module 318 can, for example, provide means for performing operation 1210. Operation 1220 can include determining an occurrence of a call failure of a voice call following performance of a CSFB procedure to transition from a first network to a legacy network. One or more of processing circuitry 310, processor 312, memory 314, transceiver(s) 316, or selection control module 318 can, for example, provide means for performing operation 1220. Operation 1230 can include barring reselection to the first network for the $t_{Barring}$ period in response to the call failure. One or more of processing circuitry 310, processor 312, memory 314, transceiver(s) 316, or selection control module 318 can, for example, provide means for performing operation 1230.

Figure 13:
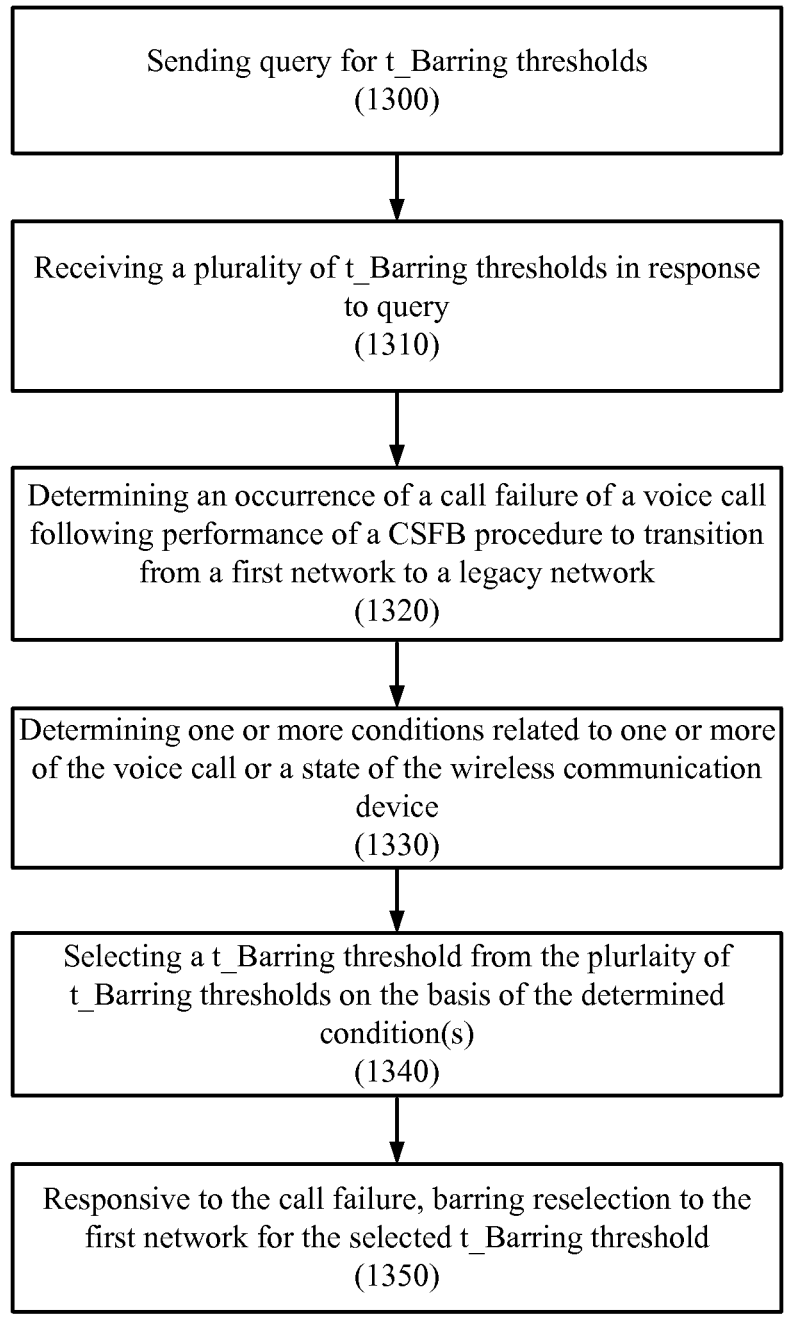
FIG. 13 illustrates a flowchart according to another example method for delaying network reselection following performance of a CSFB procedure in a call failure scenario for a network provisioned threshold barring period according to some example embodiments.

FIG. 13 illustrates a flowchart according to another example method for delaying network reselection following performance of a CSFB procedure in a call failure scenario for a network provisioned threshold barring period according to some example embodiments. In this regard, FIG. 13 illustrates operations that can be performed by a wireless communication device 202. Operation 1300 can include sending a query for $t_{Barring}$ values, such as to the threshold provisioning apparatus 208. The query can, for example, be periodically occurring and/or can be performed in response to an event, such as a change in location or connecting to a new network. One or more of processing circuitry 310, processor 312, memory 314, transceiver(s) 316, or selection control module 318 can, for example, provide means for performing operation 1300. Operation 1310 can include receiving a plurality of $t_{Barring}$ values in response to the query. The plurality of values can, for example, form an array of values with each value being indexed by a respective index value. One or more of processing circuitry 310, processor 312, memory 314, transceiver(s) 316, or selection control module 318 can, for example, provide means for performing operation 1310. Operation 1320 can include determining an occurrence of a call failure of a voice call following performance of a CSFB procedure to transition from a first network to a legacy network. One or more of processing circuitry 310, processor 312, memory 314, transceiver(s) 316, or selection control module 318 can, for example, provide means for performing operation 1320. Operation 1330 can include determining one or more conditions. The conditions can, for example, relate to the voice call (e.g., duration, relationship between the parties to the call, and/or the like) a state of the wireless communication device (e.g., a state of mobility of the device), and/or other conditions that can affect a likelihood of establishment of a successive voice call and/or a time taken to establish a successive voice call. One or more of processing circuitry 310, processor 312, memory 314, transceiver(s) 316, or selection control module 318 can, for example, provide means for performing operation 1330. Operation 1340 can include selecting a $t_{Barring}$ value from the plurality of provisioned $t_{Barring}$ values on the basis of the conditions determined in operation 1330. In embodiments in which the plurality of provisioned $t_{Barring}$ values form an array, the conditions determined in operation 1330 can be used to select a value from the array, such as on the basis of an index value that can be derived from a function of the determined conditions. One or more of processing circuitry 310, processor 312, memory 314, or selection control module 318 can, for example, provide means for performing operation 1340. Operation 1350 can include barring reselection to the first network for the selected $t_{Barring}$ period. One or more of processing circuitry 310, processor 312, memory 314, transceiver(s) 316, or selection control module 318 can, for example, provide means for performing operation 1350.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for delaying network reselection by a wireless communication device following a call failure, the method comprising:
   at the wireless communication device:
      establishing a connection to a Long Term Evolution (LTE) network;
      participating in a circuit switched fallback (CSFB) procedure to transition the wireless communication device from the LTE network to a legacy network for handling a voice call via a circuit switched (CS) domain;
      attempting the voice call via the legacy network;
      determining an occurrence of a call failure associated with the voice call attempt;

barring reselection to the LTE network for a threshold barring period after determining the occurrence of the call failure;
attempting a successive voice call via the legacy network during the threshold barring period; and
reselecting to the LTE network upon expiration of the threshold barring period when the successive voice call attempt fails.

2. The method of claim 1, wherein barring reselection comprises:
setting a timer having a time period corresponding to the threshold barring period; and
barring reselection until expiry of the timer.

3. The method of claim 1, wherein barring reselection to the LTE network comprises preventing idle mode measurement of the LTE network during the threshold barring period.

4. The method of claim 1, wherein the threshold barring period is determined based at least in part on collected historical data indicative of a time taken to establish a successive voice call following a call failure in one or more previous call failure scenarios.

5. The method of claim 4, wherein the historical data is collected by a network entity based at least in part on call failure scenarios experienced by users of the legacy network within a particular geographic area, and wherein the threshold barring period is provisioned to the wireless communication device by the legacy network.

6. The method of claim 1, wherein the threshold barring period is determined based at least in part on a mean of a probability distribution function of a random variable modeling the historical data.

7. The method of claim 6, wherein the threshold barring period is determined further based on a standard deviation of the random variable modeling the historical data.

8. The method of claim 1, wherein the threshold barring period is determined based on one or more of a state of mobility of the wireless communication device, a duration of the voice call, and a relationship between parties to the voice call.

9. The method of claim 1, wherein the wireless communication device is provisioned with a plurality of threshold barring periods that are determined based at least in part on historical data, and the method further comprises:
at the wireless communication device:
selecting a threshold barring period from the plurality of threshold barring periods based at least in part on one or more of a state of mobility of the wireless communication device, a duration of the voice call, and a relationship between parties to the call; and
barring reselection to the LTE network for the selected threshold barring period of the plurality of threshold barring periods.

10. A wireless communication device comprising:
at least one transceiver that is configurable to communicate via a first network and via a second network; and
processing circuitry coupled to the at least one transceiver, wherein the processing circuitry is operable to control the wireless communication device to at least:
determine an initiation of a voice call while connected to the first network;
participate in a circuit switched fallback (CSFB) procedure to transition the wireless communication device from the first network to the second network in response to determining the initiation of the voice call;
determine an occurrence of a call failure associated with the voice call;
bar reselection to the first network for a threshold barring period after determining the occurrence of the call failure; and
attempt a successive voice call via the second network during the threshold barring period.

11. The wireless communication device of claim 10, wherein reselection to the first network is allowed prior to an end of the threshold barring period in an instance in which the wireless communication device is directed to reselect to the first network by a network command.

12. The wireless communication device of claim 10, wherein:
the threshold barring period is determined by a network entity based at least in part on historical data indicative of a time taken to establish a successive voice call following a call failure in one or more previous call failure scenarios on the second network; and
the threshold barring period is provisioned to the wireless communication device by the network entity.

13. The wireless communication device of claim 10, wherein the threshold barring period is determined based at least in part on a mean of a probability distribution function of a random variable modeling historical data and on a standard deviation of the random variable.

14. The wireless communication device of claim 13, wherein the threshold barring period is defined as $t_{Barring}$, wherein:

$$t_{Barring} = E(t_{callback}) + \Delta,$$

wherein $$E(t_{callback}) = \int_0^{max\,t_{callback}} t_{callback} * f(t_{callback}) d(t_{callback}),$$

wherein $$\Delta \sim \sigma_{t_{callback}} = \sqrt{\int_0^\infty (t_{callback} - E(t_{callback}))^2 f(t_{callback}) d(t_{callback})},$$

and wherein $t_{callback}$ is the random variable modeling the historical data.

15. The wireless communication device of claim 10, wherein:
the threshold barring period is determined based at least in part on a state of mobility of the wireless communication device; and
the length of the threshold barring period has an inverse relationship to a velocity of the wireless communication device.

16. The wireless communication device of claim 10, wherein:
the threshold barring period is determined based at least in part on a duration of the voice call; and
the length of the threshold barring period has a direct relationship to the duration of the voice call.

17. The wireless communication device of claim 10, wherein the threshold barring period is determined based at least in part on a previous communication history between parties to the voice call.

18. The wireless communication device of claim 10, wherein the threshold barring period is determined based at least in part on whether a party to the voice call is listed in a contacts list that is stored at the wireless communication device.

19. The wireless communication device of claim 10, wherein the threshold barring period is determined based at least in part on whether the voice call is an emergency call.

20. A non-transitory computer-readable medium storing executable instructions for delaying network reselection by a wireless communication device following a call failure, that when executed, causes the wireless communication device to:
    determine an initiation of a voice call while connected to a first network;
    participate in a circuit switched fallback (CSFB) procedure to transition the wireless communication device from the first network to a second network in response to determining the initiation of the voice call;
    determine an occurrence of a call failure associated with the voice call;
    bar reselection to the first network for a threshold barring period after determining the occurrence of the call failure; and
    attempt a successive voice call via the second network during the threshold barring period.

21. The non-transitory computer-readable medium of claim 20, wherein the threshold barring period is determined based at least in part on a network-provisioned value that is determined by a network entity based at least in part on a mean of a probability distribution function of a random variable modeling historical data indicative of a time taken to establish a successive voice call following a call failure in one or more previous call failure scenarios on the second network and on a standard deviation of the random variable.

22. The non-transitory computer-readable medium of claim 21, wherein:
    the network-provisioned value is specific to a particular geographic area; and
    the network-provisioned value is received in response to the wireless communication device transitioning to a new geographic area.

23. The non-transitory computer-readable medium of claim 20, wherein a plurality of threshold barring periods are provisioned to the wireless communication device, and the execution of the executable instructions further causes the wireless communication device to:
    select a threshold barring period from the plurality of threshold barring periods based on one or more of a state of the wireless communication device, a duration of the voice call, and a relationship between parties to the voice call; and
    bar reselection to the first network for the selected threshold barring period.

* * * * *

UNITED STATES PATENT AND TRADEMARK OFFICE
CERTIFICATE OF CORRECTION

PATENT NO. : 8,830,844 B2
APPLICATION NO. : 13/871994
DATED : September 9, 2014
INVENTOR(S) : Arun G. Mathias et al.

It is certified that error appears in the above-identified patent and that said Letters Patent is hereby corrected as shown below:

In the Claims:

Column 23, line 31 (Claim 6, line 4): "the historical data" should read --historical data--.

Signed and Sealed this
Second Day of December, 2014

Michelle K. Lee
*Deputy Director of the United States Patent and Trademark Office*